(12) United States Patent
Colpaert et al.

(10) Patent No.: US 11,053,170 B2
(45) Date of Patent: Jul. 6, 2021

(54) LIQUID UREASE INHIBITOR FORMULATIONS

(71) Applicant: YARA INTERNATIONAL ASA, Oslo (NO)

(72) Inventors: Filip Colpaert, Zwijnaarde (BE); Francois Ledoux, Cormeilles en Parisis (FR); Ruud Van Belzen, Middelburg (NL)

(73) Assignee: YARA INTERNATIONAL ASA, Oslo (NO)

( * ) Notice: Subject to any disclaimer, the term of this patent is extended or adjusted under 35 U.S.C. 154(b) by 245 days.

(21) Appl. No.: 16/075,695

(22) PCT Filed: Feb. 24, 2017

(86) PCT No.: PCT/EP2017/054397
§ 371 (c)(1),
(2) Date: Aug. 6, 2018

(87) PCT Pub. No.: WO2017/144698
PCT Pub. Date: Aug. 31, 2017

(65) Prior Publication Data
US 2019/0039962 A1  Feb. 7, 2019

(30) Foreign Application Priority Data
Feb. 24, 2016  (EP) .................................. 16157221

(51) Int. Cl.
*C05C 9/00*  (2006.01)
*C05G 3/90*  (2020.01)
*C05G 5/20*  (2020.01)

(52) U.S. Cl.
CPC ................ *C05C 9/005* (2013.01); *C05G 3/90* (2020.02); *C05G 5/20* (2020.02)

(58) Field of Classification Search
CPC .... C05C 1/00; C05C 5/04; C05C 9/00; C05G 3/90; C05G 5/20
See application file for complete search history.

(56) References Cited

U.S. PATENT DOCUMENTS

| 5,698,003 A | 12/1997 | Omilinsky et al. |
| 9,637,420 B2 * | 5/2017 | McKnight ................ C05G 3/90 |

(Continued)

FOREIGN PATENT DOCUMENTS

| CA | 2938563 A1 | 8/2015 | |
| EP | 2032589 | * 3/2009 | ............... C05C 9/00 |

(Continued)

OTHER PUBLICATIONS

PCT International Search Report and Written Opinion dated Jun. 1, 2017 for PCT International Patent Application No. PCT/EP2017/054397, 13 pages.

(Continued)

*Primary Examiner* — Jennifer A Smith
*Assistant Examiner* — Amanda Garley
(74) *Attorney, Agent, or Firm* — Amster, Rothstein & Ebenstein LLP

(57) ABSTRACT

The present application generally relates to a method for the manufacture of a liquid composition essentially consisting of an organic solvent of the type glycol and a urease inhibitor of the type phosphoric triamide and products obtained therewith.

24 Claims, 6 Drawing Sheets

(56) References Cited

U.S. PATENT DOCUMENTS

| | | | |
|---|---|---|---|
| 9,822,044 B2* | 11/2017 | Hayes | C05G 3/90 |
| 2010/0206031 A1 | 8/2010 | Whitehurst et al. | |
| 2011/0233474 A1* | 9/2011 | Cigler | C09K 15/32 |
| | | | 252/400.21 |
| 2011/0259068 A1 | 10/2011 | Whitehurst et al. | |
| 2014/0060132 A1 | 3/2014 | Roberts | |
| 2014/0090432 A1 | 4/2014 | McKnight et al. | |
| 2015/0143860 A1* | 5/2015 | McKnight | C05G 3/08 |
| 2015/0299062 A1 | 10/2015 | McKnight et al. | |

FOREIGN PATENT DOCUMENTS

| | | | |
|---|---|---|---|
| EP | 2885262 | 6/2015 | |
| EP | 3303264 B1 * | 4/2018 | C07F 9/224 |
| WO | 97/22568 A1 | 6/1997 | |
| WO | 2014028767 A1 | 2/2014 | |
| WO | 2014036278 A1 | 3/2014 | |
| WO | 2015116842 A1 | 8/2015 | |
| WO | 2015/161195 A1 | 10/2015 | |

OTHER PUBLICATIONS

PCT Notification of Transmittal of the International Preliminary Report on Patentability dated May 24, 2018 for PCT International Patent Application No. PCT/EP2017/054397, 16 pages.

Indian Office Action dated Jul. 2, 2020 from Indian Patent Appln. No. 201817033403.

Colombian Office Action dated Jan. 29, 2021 from Colombian Patent Application No. NC2018/0008847 (with English language translation).

* cited by examiner

LIQUID UREASE INHIBITOR FORMULATIONS

CROSS-REFERENCE TO RELATED APPLICATIONS

This application is a U.S. national stage entry under 35 U.S.C. § 371 of PCT International Patent Application No. PCT/EP2017/054397, filed Feb. 24, 2017, which claims priority to European Patent Application No. 16157221.9, filed Feb. 24, 2016, the contents of which are incorporated herein by reference in their entirety.

TECHNICAL FIELD

The present application generally relates to a method for the manufacture of a liquid composition essentially consisting of an organic solvent of the type glycol and a urease inhibitor of the type phosphoric triamide and products obtained therewith.

Background

Urea is the most common nitrogen-containing fertilizer. Urea has the highest nitrogen content of all nitrogen-containing fertilizers in common use (46%). Its consumption worldwide has been considerably increased, from about 20 million tons in the early seventies to about 100 million tons at the beginning of the twenty first century. Nitrogen is a basic element for any living system as a constituent of protein. Unfortunately, urea nitrogen cannot be assimilated directly by the plants and needs to be converted through hydrolysis into ammonium and nitrification into nitrate. Urea is first hydrolysed in the soil under the action of an enzyme, commonly called urease, to produce ammonia and carbon dioxide. Ureases are found in numerous bacteria, fungi, algae, plants and some invertebrates, as well as in soils, as a soil enzyme. Urea hydrolysis tends to increase the pH of its environment as the ammonia is dissolved into the water in the soil, and part of the ammonia can also be released into the atmosphere, a process called ammonia volatilization, thus becoming unavailable for the plant. About 50 weight % of nitrogen can sometimes be lost as a result of the volatilization of ammonia, all depending on the soil type, water content, pH, climate conditions, etc.

The availability of nitrogen, originating from urea, to the root system of plants can be improved by combining a urea-containing fertilizer (i.e. by incorporation or addition) with a urease inhibitor. Urease inhibitors are compounds that are capable of temporarily reducing the activity of the enzyme and slow down the rate at which urea is hydrolysed, avoiding peaks of ammonia concentration and therefore limiting the losses to the air. There are many compounds that can inhibit urease, but only a few that are non-toxic, effective at low concentrations, chemically stable enough and able to be combined with urea-containing fertilizers.

Among the most effective urease inhibitors known today are the phosphoric triamide compounds, first disclosed in U.S. Pat. No. 4,530,714 (Allied Corporation, 1985). An example of an effective urease inhibitor, disclosed in said patent is N-(n-butyl) thiophosphoric triamide, which will be referred to herein as nBTPT. This compound is actually the precursor for the active compound N-(n-butyl) phosphoric triamide (nBPT), obtained through oxidation of the thio-compound, but it is the thio-compound that is commonly produced, sold and used. Throughout this application, when referring to urease inhibitors of the type phosphoric triamide, it is understood that this comprises all active compounds, active precursors and active conversion products, resulting from said phosphoric triamides.

Phosphoric triamides may also prevent the enzymatic cleavage of urea in animal wastes, thereby decreasing odour. Similarly, the urease inhibitors may mask animal urine odour, thus dissuading animals from undesired territorial behaviour, including territorial marking with urine.

Industrial grade nBTPT is a solid, waxy compound, which has a melting point of about 58-60° C., and which starts to decompose in contact with moisture and at elevated temperatures, in particular above 60° C. Direct application onto urea particles is very difficult. Thus, what is needed is a solvent system, in which the nBTPT is sufficiently soluble and stable, which has a high resistance against crystallization of the nBTPT at a low temperature, a low viscosity at high concentrations of nBTPT, a low toxicity, a low volatility, a low odour/smell, a low flammability, lacks the addition of toxic auxiliary compounds and which can be produced at a low cost.

A large amount of R&D, reflected in a large number of patent publications, has since been devoted to identifying suitable solvents, solvent systems, or solvent systems compositions comprising additives, to confer the required properties to the liquid composition comprising phosphoric triamides, in particular nBTPT, in particular a high solubility and stability of phosphoric triamides, in particular nBTPT, in the solvent system, a high resistance of the solution of phosphoric triamides, in particular nBTPT, against crystallization at a low temperature, a low viscosity at high concentrations of the phosphoric triamides, in particular nBTPT, a low volatility, a low odour/smell, a low flammability, and which can be produced at a low cost.

EP 0 869 933 A1 and WO 97/22568 (IMC-AGRICO Company, 1997) discloses a solution which consists of 25 weight % of active ingredient nBTPT (added using industrial grade nBTPT, which contained about 89% of active ingredient nBTPT) in a solvent selected from the group of glycols and glycol derivatives, in particular propylene glycol (propaan-1,2-diol). No details are disclosed as to the particulars of the method of adding nBTPT into the solvent.

US2014/0090432 (McKnight et al., 2014) disclose improved liquid delivery formulations of urease inhibitors and/or nitrification inhibitors, designed to apply to urea, comprising mixtures of aprotic solvents, such as DMSO and protic solvents, such as alcohols/polyols.

US2015/0143860 A1 and WO2015161195A1 (McKnight et al., 2015) disclose improved liquid delivery formulations of urease inhibitors and/or nitrification inhibitors, designed to apply to urea, comprising mixtures of aprotic solvents, such as DMSO, een alkanolamine and/or ethyl, propyl, or butyl lactate. Example 18 discloses that a solution of nBTPT in propylene glycol, produced by dissolving 20 weight % of nBTPT in warm propylene glycol at 38° C., followed by cooling to 30° C., did not have a low enough chill point (46° F.) to be suitable as a liquid delivery formulation.

The inventors have now found that a liquid composition, essentially consisting of an organic solvent of the type glycol and a urease inhibitor of the type phosphoric triamide, can be prepared with the method according to the invention, that results in a stable composition wherein the phosphoric triamide, in particular nBTPT, has a high solubility and stability, which has a high resistance against crystallization of the phosphoric triamide, in particular nBTPT, at a low temperature, a low viscosity at high concentrations of the phosphoric triamide, in particular nBTPT, a low volatility, a low odour/smell, a low flammability, lacks the addition of toxic auxiliary compounds, and which can be produced at a low cost.

In particular, the liquid composition, essentially consisting of an organic solvent of the type glycol and a urease inhibitor of the type phosphoric triamide is free of dimethyl sulfoxide (DMSO).

The foregoing examples of the related art and limitations related therewith are intended to be illustrative and not exclusive. Other limitations of the related art will become apparent to those of skill in the art upon a reading of the specification and a study of the drawings and figures.

SUMMARY

The following embodiments and aspects thereof are described and illustrated in conjunction with systems, tools and methods which are meant to be exemplary and illustrative, and not limiting in scope. In various embodiments, one or more of the above-described problems has been reduced or eliminated, while other embodiments are directed to other improvements.

Briefly, therefore, one aspect of the present invention encompasses a method for the manufacture of a liquid composition essentially consisting of an organic solvent of the type glycol and a urease inhibitor of the type phosphoric triamide, and optionally a dye system, wherein the method comprises the step of heating an amount of said organic solvent of the type glycol to a first temperature at least above 20° C. but below the melt temperature of said urease inhibitor of the type phosphoric triamide, and subsequently adding an amount of solid urease inhibitor of the type phosphoric triamide in said amount of organic solvent of the type glycol at a second temperature which is at most about equal to the first temperature, wherein the method comprises the further step of
  i) maintaining the liquid composition essentially consisting of an organic solvent of the type glycol and a urease inhibitor of the type phosphoric triamide, and optionally a dye system, at a third temperature, which temperature is equal to or greater than the first temperature, preferably in the range of 60 to 80° C.; and/or
  ii) subjecting the liquid composition essentially consisting of an organic solvent of the type glycol and a urease inhibitor of the type phosphoric triamide, and optionally a dye system, to an ultrasonic treatment.

Another aspect of the invention provides a liquid composition essentially consisting of an organic solvent of the type glycol and a urease inhibitor of the type phosphoric triamide, and optionally a dye system, having a crystallization temperature of the urease inhibitor of the type phosphoric triamide in said organic solvent of the type glycol of less than 0° C., in particular less than −2° C., preferably less than −4° C., more preferably less than −6° C., most preferably less than −8° C.

Another aspect of the invention provides a liquid composition essentially consisting of propylene glycol (PG), in particular propaan-1,2-diol, as a solvent and 10 to 20 weight % of N-(n-butyl) thiophosphoric triamide (nBTPT), in particular 15 to 18 weight %, more in particular about 17.5 weight %, relative to the total weight of the liquid solution.

Another aspect of the invention provides a liquid composition essentially consisting of diethylene glycol monomethyl ether (DEGMME), diethylene glycol monobutyl ether (DEGMBE), or combinations thereof, optionally further including propylene glycol (PG), as a solvent and 10 to 40 weight % of N-(n-butyl) thiophosphoric triamide (nBTPT), in particular 15 to 30 weight %, more in particular about 25 weight %, relative to the total weight of the liquid solution.

A further aspect of the present invention provides a solid particulate urea-based composition, comprising a solid particulate urea-based compound and the liquid composition according to the invention, wherein said liquid composition forms at least partially a coating on at least part of the particles comprising the urea-based compound.

A further aspect of the present invention provides a solid particulate urea-based composition, comprising a solid particulate urea-based compound and the liquid composition according to the invention, wherein said liquid composition is incorporated within at least part of the particles comprising the urea-based compound.

A further aspect of the present invention provides a liquid urea-based composition, comprising a dissolved urea-based compound and the liquid composition according to the invention, wherein said liquid composition according to the invention is intimately mixed with the urea-based compound dissolved in a solvent system.

A further aspect of the present invention provides the use of the solid particulate or liquid urea-based composition according to the invention as a urea-containing fertilizer.

Other features and iterations of the invention are described in more detail below.

DETAILED DESCRIPTION

Disclosed herein are methods for the manufacture of a liquid composition essentially consisting of an organic solvent of the type glycol and a urease inhibitor of the type phosphoric triamide. The present invention also provides liquid compositions essentially consisting of propylene glycol (PG), diethylene glycol monomethyl ether (DEGMME), diethylene glycol monobutyl ether (DEGMBE), or combinations thereof, as a solvent and N-(n-butyl) thiophosphoric triamide (nBTPT). In particular, the liquid compositions comprise a urease-inhibiting effective amount of at least one N-(n-butyl) thiophosphoric triamide (nBTPT), so that the rate of urea volatilization in a urea-containing fertilizer is delayed or at least substantially retarded.

Additional embodiments and features are set forth in part in the description that follows, and in part will become apparent to those skilled in the art upon examination of the specification, or may be learned by the practice of the embodiments discussed herein. A further understanding of the nature and advantages of certain embodiments may be realized by reference to the remaining portions of the specification the drawings, the chemical structures, and descriptions, which forms a part of this invention. Any description of any R-group or chemical substituent, alone or in any combination, may be used in any chemical formula described herein, and chemical formulae include all conformational and stereoisomers, including diastereomers, epimers, and enantiomers. Moreover, any feature of a composition disclosed herein may be used in combination with any other feature of a composition disclosed herein.

In its broadest sense, the present invention encompasses a method for the manufacture of a liquid composition essentially consisting of an organic solvent of the type glycol and a urease inhibitor of the type phosphoric triamide, wherein the method comprises the step of heating an amount of said organic solvent of the type glycol to a first temperature at least above 20° C. but below the melt temperature of said urease inhibitor of the type phosphoric triamide, and subsequently adding an amount of solid urease inhibitor of the type phosphoric triamide in said amount of organic solvent of the type glycol at a second temperature which is at most about equal to the first temperature, wherein the method comprises the further step of
  i) maintaining the liquid composition essentially consisting of an organic solvent of the type glycol and a urease inhibitor of the type phosphoric triamide, and optionally a dye system, at a third temperature, which temperature is equal to or greater than the first temperature, preferably in the range of 60 to 80° C.; and/or
  ii) subjecting the liquid composition essentially consisting of an organic solvent of the type glycol and a urease inhibitor of the type phosphoric triamide, and optionally a dye system, to an ultrasonic treatment.

Surprisingly, the inventors have found that a liquid composition essentially consisting of an organic solvent of the type glycol and a urease inhibitor of the type phosphoric triamide prepared as claimed, without the addition of substantial amounts of further (GHS-classified) solvents or (GHS-classified) additives, offers a high solubility and stability of the urease inhibitor of the type phosphoric triamide, in particular nBTPT, in the solvent, resistance of the liquid solution against crystallization of the urease inhibitor of the type phosphoric triamide, in particular nBTPT, at a low temperature, low viscosity at the claimed concentrations, low toxicity, low volatility, low odour/smell and low flammability, and can be produced at a low cost.

Without wishing to be bound by theory, it is hypothesized that the addition of a solid urease inhibitor of the type phosphoric triamide, in particular nBTPT, to a warm liquid solvent system, heated to a temperature of at least above 20° C., and kept at a third temperature, equal to or greater than the first temperature, preferably in the range of 60 to 80° C., and/or subjected to an ultrasonic treatment, effectively dissolves the urease inhibitor and avoids or removes the flocs (undissolved solid compound, mostly not visible to the eye) that may act as crystallization nuclei to initiate the crystallization upon cooling to below the crystallization temperature, and that can settle over time, during storage, leading to heterogeneous solutions and handling issues. In contrast, the addition of liquid phosphoric triamide, in particular nBTPT to a solvent system, either at room temperature or above, did not provide the stable composition according to the invention, neither did the addition of solid phosphoric triamide, in particular nBTPT, to a solvent system at room temperature.

In the context of the invention, with "maintaining", in particular the liquid composition essentially consisting of an organic solvent of the type glycol and a urease inhibitor of the type phosphoric triamide, and optionally a dye system, is meant that said liquid composition is kept in a homogeneous state.

The method according to the invention, as well as the liquid composition produced therewith does not comprise any other substances other than an organic solvent of the type glycol and a urease inhibitor of the type phosphoric triamide, and optionally a dye system, in particular does not comprise DMSO. The term "essentially consisting of" should be interpreted as consisting for 98 weight % or more, such as 98 weight %, 99 weight %, 99.5 weight % or 99.75 weight % of said three listed components, the rest being impurities or compounds that are not intended to perform any function in the method or liquid composition according to the invention, such as surfactants, dissolution agents, nutrient components and the like, and which could add to the toxic element loading of the composition.

(a) Urease Inhibitor

Another aspect of the invention provides a method for the manufacture of a liquid composition essentially consisting of an organic solvent of the type glycol and a urease inhibitor of the type phosphoric triamide, wherein the urease inhibitor of the type phosphoric triamide is a compound of formula (I):

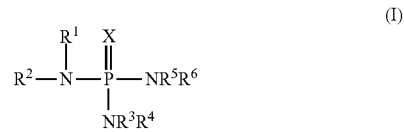

wherein:
X is oxygen or sulphur;
$R^1$ is selected from the group consisting of alkyl, cycloalkenyl, aralkyl, aryl, alkenyl, alkynyl, and cycloalkyl; and
$R^2$ is selected from the group consisting of hydrogen, alkyl, cycloalkenyl, aralkyl, aryl, alkenyl, alkynyl, and cycloalkyl, or
$R^1$ and $R^2$ together may form an alkylene or alkenylene chain which may optionally include one or more heteroatoms of divalent oxygen, nitrogen or sulphur, completing a 4-, 5-, 6-, 7-, or 8-membered ring structure; and
$R^3$, $R^4$, $R^5$ and $R^6$ are individually selected from the group consisting of hydrogen and alkyl having 1 to 6 carbon atoms, and
$R^1$, $R^2$, $R^3$, $R^4$, $R^5$ and $R^6$, when not hydrogen, may each be optionally substituted with one or more selected from the group consisting of trihalomethyl, naphthoxy, alkyl, halogen, arylmercapto, phenoxy, phenyl, nitro, cyano, amino, alkylamino, dialkylamino, alkoxy, mercapto, alkylmercapto, alkylcarbonyl, arylamino, arylcarbonyl, alkoxycarbonyl, carboxy, diarylamino, and carbonamide.

In some embodiments X may be sulphur.
In other embodiments, $R^1$ may be alkyl, cycloalkyl, aryl, or substituted aryl. The substitution may be selected from the group consisting of $C_1$-$C_4$-alkyl, butyl, cyclohexyl, phenyl, and nitrophenyl.
In some embodiments, $R^1$ may be alkyl.
In yet other embodiments $R^2$, $R^3$, $R^4$, $R^5$ and $R^6$ may each be hydrogen.
In particular embodiments, X may be sulphur, $R^1$ may be alkyl, and $R^2$, $R^3$, $R^4$, $R^5$ and $R^6$ may each be hydrogen.
In further embodiments, the phosphoric triamide comprising Formula (I) may be selected from the group consisting of N-(n-butyl) thiophosphoric triamide (nBTPT), N-cyclohexyl thiophosphoric triamide, and N-(2-nitrophenyl) phosphoric triamide.

In particular embodiments, the phosphoric triamide may be N-(n-butyl) thiophosphoric triamide (nBTPT).

The amount of urease inhibitor of the type phosphoric triamide, in particular nBTPT, in the method according to the invention may vary, depending on the application. In general, the weight percentage of nBTPT to the total composition may range from 1 to 45 weight %, relative to the total weight of said liquid composition.

In a specific embodiment of the method according to the invention, the weight percentage of nBTPT to the total composition may range from 10 weight % to 20 weight %, relative to the total weight of said liquid composition. In various embodiments, the weight percent of urease inhibitor of the type phosphoric triamide, in particular nBTPT to the total composition may be about 10 weight %, about 11 weight %, about 12 weight %, about 13 weight %, about 14 weight %, about 15 weight %, about 16 weight %, about 17 weight %, about 18 weight %, about 19 weight %, or about 20% weight %, relative to the total weight of the liquid composition.

In one embodiment of the method according to the invention, the weight percent of urease inhibitor of the type phosphoric triamide, in particular nBTPT in the total composition may be greater than 10 weight %. A concentration lower than 10 weight % does not provide the required benefits. For example, a dilution of the composition according to the invention to less than 10 weight % increases the cost per unit of active ingredient and also increase the transportation cost, without an advantage such as a lower crystallization temperature.

In one embodiment of the method according to the invention, the weight percent of urease inhibitor of the type phosphoric triamide, in particular nBTPT in the total composition may be less than 20 weight %. A concentration higher than 20 weight % does not add extra benefits. For example, a more concentrated composition makes it cheaper per unity of volume, but the composition crystallizes more easier, making it less useful in areas where it is stored at low temperature.

In exemplary embodiments of the method according to the invention, the weight percent of urease inhibitor of the type phosphoric triamide, in particular nBTPT in the total composition may range from about 15 weight % to about 20 weight %.

In other exemplary embodiments of the method according to the invention, the weight percent of urease inhibitor of the type phosphoric triamide, in particular nBTPT, in the total composition may range from about 16 weight % to about 18 weight %.

In one particular exemplary embodiment of the method according to the invention, the weight percent of urease inhibitor of the type phosphoric triamide, in particular nBTPT, in the total composition may be 17.5 weight %.

Prior art commercial solutions are available, for example as Agrotain® Ultra (Koch, US), N Yield™ (Eco Agro, USA), Rhodia Ag-Rho™ N Protect B (Solvay, Germany), Iper N-Protect Liquid (Van Iperen, The Netherlands) and BASF Limus (BASF, Germany), which all comprise a higher amount of nBTPT, typically 20 weight % or more, such as 25 weight %, optionally with further solvents or additives.

With the method according to the invention, a liquid composition essentially consisting of an organic solvent of the type glycol and a urease inhibitor of the type phosphoric triamide, is manufactured that, applied to a solid, particulate, urea-based blend composition comprising a urea ammonium sulphate-based composition in particulate form comprising urea ammonium sulphate, in combination with a stabilizer, selected from the group of alkaline or alkaline-forming inorganic or organic compounds that is able to interact with ammonium sulphate, is able to provide as much nBTPT in the field as said prior art commercial solutions, which comprise a higher amount of nBTPT. This finding is disclosed in a copending application of the applicant.

With the method according to the invention, a liquid composition essentially consisting of an organic solvent of the type glycol and a urease inhibitor of the type phosphoric triamide, is manufactured that, applied to a solid, particulate, urea-based blend composition comprising a urea-based compound in particulate form, one or more components selected from the group of nitrates, phosphates, sulphates and chlorides in particulate form, in combination with one or more alkaline or alkaline-forming inorganic or organic compounds that is able to interact with the one or more components selected from the group of nitrates, phosphates, sulphates and chlorides in particulate form, is able to provide as much nBTPT in the field as said prior art commercial solutions which comprise a higher amount of nBTPT. This finding is disclosed in a copending application of the applicant.

The liquid composition essentially consisting of an organic solvent of the type glycol and a urease inhibitor of the type phosphoric triamide can be produced with the method according to the invention at a lower cost than the prior art compositions and introduces less non-fertilizer products into the environment, when used in combination with a urea-based fertilizer. Moreover, extra chemicals are not needed, while some may be either toxic for the environment or for the farmer when handling the product, such as NMP, DMSO and the like, and less volatile compounds are introduced into the environment. The claimed composition according to the invention offers a product that is safe for the user, as well as for the environment.

In exemplary embodiments, the urease inhibitor is used in its solid form as a powder, preferably with a purity of 97%, or 99%, or more. It is available, for example, from Shangyu Sunfit Chemical Co. Ltd Shangyu Fine Chemical Industry Zone, China). Within the ambit of this invention, the amount of urease inhibitor of the type phosphoric triamide, in particular nBTPT, refers to the amount of active compound, excluding amounts of impurities.

(b) Organic Solvent

In the method or the liquid composition according to the invention, the at least one organic solvent is of the type glycol. According to its broadest definition, diols are compounds in which two hydroxy groups are present on different carbon atoms, usually but not necessarily adjacent.

In one embodiment, the organic solvent of the type glycol is a compound of formula (II)

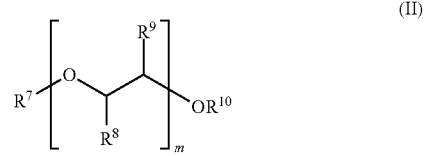

(II)

wherein
$R^7$ is hydrogen or alkyl;
$R^8$ is hydrogen or alkyl
$R^9$ is hydrogen, =O, or alkyl;
$R^{10}$ is hydrogen, alkyl, or acyl; and
m is 1 to 4;
wherein $R^7$ and $R^8$, or $R^7$ and $R^{10}$ together may form a ring comprising one or more oxygen atoms.

In some embodiments, $R^7$ may be hydrogen.
In other embodiments, $R^8$ may be methyl.
In still other embodiments, m may be 1.
In particular embodiments, $R^7$ may be hydrogen, $R^8$ may be methyl, and m may be 1.
In still other embodiments, $R^7$ may be butyl, $R^8$ may be hydrogen, and m may be 1.

In some embodiments, the organic solvent of the type glycol is a compound of formula (III)

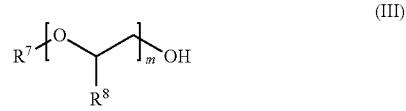

(III)

wherein:

$R^7$ is hydrogen or alkyl;

$R^8$ is hydrogen or alkyl; and m is 1 to 4.

In some embodiments, $R^7$ may be hydrogen.

In other embodiments, $R^8$ may be methyl.

In still other embodiments, m may be 1.

In particular embodiments, $R^7$ may be hydrogen, $R^8$ may be methyl, and m may be 1.

In still other embodiments, $R^7$ may be butyl, $R^8$ may be hydrogen, and m may be 1.

Suitable glycols include alkylene glycols, such as 1,2-ethanediol (ethylene glycol), 1,2-propanediol (propylene glycol), 1,3-propanediol, 1,2-butanediol, 1,3-butanediol, 1,4-butanediol, and 1,5-pentanediol.

For the purpose of this application, also polyalkylene glycols, such as polyethylene glycol, for example di(ethylene glycol), tri(ethylene glycol), tetra(ethylene glycol), and hexa(ethylene glycol); or polypropylene glycol, for example di(propylene glycol), tri(propylene glycol), and tetra(propylene glycol) will be regarded as glycols. Optionally, the glycol may comprise a terminal alkoxyl group, such as methoxy, ethoxy, propoxy, or butoxy.

In particular embodiments, the organic solvent of the type glycol may be propylene glycol, diethylene glycol monomethyl ether (DEGMME), diethylene glycol monobutyl ether (DEGMBE), or combinations thereof.

In exemplary embodiments, the organic solvent of the type glycol may be propylene glycol.

The amount of glycol in the method according to the invention, may vary. In general, the weight percent of glycol to the total composition may range from 55 to 99 weight %. In various embodiments, the weight percent of glycol to the total composition may be about 80 weight %, about 81 weight %, about 82 weight %, about 83 weight %, about 84 weight %, about 85 weight %, about 86 weight %, about 87 weight %, about 88 weight %, about 89 weight % or about 90 weight %.

In exemplary embodiments, the weight percent of glycol in the total composition may range from about 80 weight % to about 85 weight %.

In one embodiment, the weight percent of glycol in the total composition is more than about 80 weight %.

In one embodiment, the weight percent of glycol in the total composition is less than about 90 weight %.

The liquid composition according to the invention should not comprise other solvents in addition to those described above.

(c) Temperatures

The method for the manufacture of a liquid composition essentially consisting of an organic solvent of the type glycol and a urease inhibitor of the type phosphoric triamide comprises the step of heating an amount of said organic solvent of the type glycol to a first temperature at least above 20° C. but below the melt temperature of said urease inhibitor of the type phosphoric triamide.

In various embodiments, the first temperature may range from 20° C. to 60° C.

In various embodiments, the first temperature may be about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., about 55° C., about 56° C., about 57° C., about 58° C., about 59° C. or about 60° C.

In one particular embodiment, the first temperature is more than 35° C. preferably from 35 to 60° C.

In one embodiment, the first temperature is more than 40° C.

In one embodiment, the first temperature is less than the melt temperature of said urease inhibitor of the type phosphoric triamide. This temperature is necessary to obtained the claimed benefits. Furthermore, it is obvious that this temperature should not be higher than the decomposition temperature of the urease inhibitor of the type phosphoric triamide to avoid decomposition of the phosphoric triamide compound when added to the heated solvent.

In exemplary embodiments, in particular where nBTPT is used in propylene glycol, the first temperature may range from about 35 to 60° C.

The method for the manufacture of a liquid composition essentially consisting of an organic solvent of the type glycol and a urease inhibitor of the type phosphoric triamide comprises the step of adding an amount of solid urease inhibitor of the type phosphoric triamide in said amount of organic solvent of the type glycol at a second temperature which is at most about equal to the first temperature.

In various embodiments, the second temperature may range from 20° C. to 60° C.

In various embodiments, the first temperature may be about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., about 55° C., about 56° C., about 57° C., about 58° C., about 59° C. or about 60° C.

In one embodiment, the second temperature is more than 35° C., preferably from 35 to 60° C.

In one embodiment, the second temperature is more than 40° C.

In one embodiment, the second temperature is less than the melt temperature of said urease inhibitor of the type phosphoric triamide. This temperature is necessary to obtained the claimed benefits. Furthermore, it is obvious that this temperature should not be higher than the decomposition temperature of the urease inhibitor of the type phosphoric triamide to avoid decomposition of the phosphoric triamide compound when added to the heated solvent.

In exemplary embodiments, in particular where nBTPT is used in propylene glycol, the second temperature may range from about 35 to 60° C.

In one embodiment, the second temperature is different from the first temperature.

In exemplary embodiments, the second temperature is identical to the first temperature. The latter implies that, upon adding the amount of urease inhibitor of the type phosphoric triamide, in particular nBTPT to the heated organic solvent of the type glycol, measures should be applied to level out a decrease or increase in the temperature of the resulting mixture, such as cooling or heating the resulting mixture.

(d) Additional Heating Step

The method for the manufacture of a liquid composition essentially consisting of an organic solvent of the type glycol and a urease inhibitor of the type phosphoric triamide, and optionally a dye system, may comprises the step of maintaining said liquid composition at a third temperature which is equal to or greater than the first temperature. It is believed that this step reduces the number of crystallization seeds and increases the crystallization stability of the liquid composition according to the invention.

In one embodiment, the third temperature may be higher that the melting temperature of the urease inhibitor of the type phosphoric triamide.

In various embodiments, the third temperature may range from 60° C. to 80° C.

In various embodiments, the third temperature may be about 60° C., about 61° C., about 62° C., about 63° C., about 64° C., about 65° C., about 66° C., about 67° C., about 68° C., about 69° C., about 70° C., about 71° C., about 72° C., about 73° C., about 74° C., about 75° C., about 76° C., about 77° C., about 78° C., about 79° C. or about 80° C.

In one embodiment, the third temperature is more than 60° C.

In one embodiment, the third temperature is less than 80° C.

In exemplary embodiments, in particular where nBTPT is used, the third temperature may range from about 60 to 80° C.

In one embodiment, the third temperature is different from the first and/or second temperature.

In one embodiment, the time the liquid composition essentially consisting of an organic solvent of the type glycol and a urease inhibitor of the type phosphoric triamide, and optionally a dye system, is kept at the third temperature, ranges from a few minutes to 4 hours. Exemplary, such time may be up to 10 minutes, 20 minutes, 30 minutes, 40 minutes, 50 minutes, 60 minutes, 70 minutes, 80 minutes, 90 minutes, 100 minutes, 110 minutes or 120 minutes.

In one embodiment, the liquid composition essentially consisting of an organic solvent of the type glycol and a urease inhibitor of the type phosphoric triamide, and optionally a dye system, is stirred while kept at the third temperature.

(e) Additional Ultrasonic Treatment

The method for the manufacture of a liquid composition essentially consisting of an organic solvent of the type glycol and a urease inhibitor of the type phosphoric triamide, and optionally a dye system, may comprises the step of ultrasonically treating said liquid composition. It is believed that this step reduces the number of crystallization seeds and increases the crystallization stability of the liquid composition according to the invention.

With ultrasonic treatment is meant any treatment that is equivalent to the treatment as described in the experimental part, in particular using a frequency of more than 20 kHz, in particular of 37 kHz and a power of between 0.1 and 10 kW, in particular of between 200 and 1000 W, depending on the scale of the embodiment.

In one embodiment, the ultrasonic treatment is carried out at the first temperature.

In one embodiment, the ultrasonic treatment is carried out at the second temperature.

In one embodiment, the ultrasonic treatment is carried out at the third temperature.

In one embodiment, the ultrasonic treatment is carried out at any temperature between the first and the third temperature.

In one embodiment, the ultrasonic treatment is carried out for a time, ranging from a few minutes to 4 hours. Exemplary, such time may be up to 10 minutes, 20 minutes, 30 minutes, 40 minutes, 50 minutes, 60 minutes, 70 minutes, 80 minutes, 90 minutes, 100 minutes, 110 minutes or 120 minutes.

In one embodiment, the liquid composition essentially consisting of an organic solvent of the type glycol and a urease inhibitor of the type phosphoric triamide, and optionally a dye system, is stirred while subjected to the ultrasonic treatment.

The method for the manufacture of a liquid composition essentially consisting of an organic solvent of the type glycol and a urease inhibitor of the type phosphoric triamide, and optionally a dye system, may comprises both the steps of maintaining said liquid composition at a third temperature which is equal to or greater than the first temperature, and ultrasonically treating said liquid composition.

In exemplary embodiments, the ultrasonic treatment is carried out at 20° C. a liquid composition essentially consisting of an organic solvent of the type glycol and a urease inhibitor of the type phosphoric triamide, and optionally a dye system, after which the such treated liquid composition essentially consisting of an organic solvent of the type glycol and a urease inhibitor of the type phosphoric triamide, and optionally a dye system is kept at the third temperature.

(f) Further Components

In various embodiments, method and the resulting liquid composition according to the invention may further comprise adding a dye, pigment, pigment dispersion, lake pigment, colour additive, and the like, herein further called a dye system. The dye system may serve several purposes: to show that the urea-containing fertilizer has been adequately covered with the liquid composition according to the invention, in particular with the urease inhibitor of the type phosphoric triamide, in particular nBTPT, to aid the user in monitoring the application of the urea-containing fertilizer to the field, in the handling chain to help differentiating treated urea containing fertilizer from untreated one, and to support the brand of commercially available products.

According to one embodiment, the method according to the invention further comprising a step wherein an amount of a dye system is added to the liquid composition essentially consisting of an organic solvent of the type glycol and a urease inhibitor of the type phosphoric triamide at a fourth temperature.

The step of adding a dye may be carried out before or after the addition of the urease inhibitor of the type phosphoric triamide to the organic solvent of the type glycol, or before or after the step of additional heating or ultrasonic treatment.

In some embodiments, the dye system may be an industrial grade or an Food, Drug & Cosmetic (FD&C) grade dye.

In preferred embodiments, the dye system is compatible with the composition to which it is added, in the sense that the dye system does not interact with the components of the composition, it does not degrade nor aids the degradation of the urease inhibitor of the type phosphoric triamide, nor does it deteriorate any of the properties of the composition to which it is added, in particular the stability of the composition to which it is added.

In exemplary embodiments, the dye system may be a water-based dye, comprising an active dye compound and water. Surprisingly, it was shown that the small amount of such aqueous solution had no detrimental influence on composition to which it was added.

In exemplary embodiments, the dye system may be a dye system that is soluble in the solvent of the type glycol. Surprisingly, it was shown that the small amount of such aqueous solution had no detrimental influence on composition to which it was added. Without wishing to be bound by theory, it is hypothesized that the addition of a glycol-soluble dye system does not add crystallization nuclei to the composition according to the invention, such that a low crystallization temperature of the urease inhibitor may be obtained.

The amount of dye system in the liquid composition may vary. In general, the weight percent of dye system to the total composition may range from 0 to 1 weight %.

In various embodiments, the weight percent of dye system to the total composition may be about 0.05 weight %, 0.1 weight %, 0.15 weight %, 0.204 weight %, 0.25 weight %, 0.30 weight %, 0.35 weight %, 0.40 weight %, 0.45 weight %, 0.50 weight %, 0.55 weight %, 0.60 weight %, 0.65 weight %, 0.70 weight %, 0.75 weight %, 0.80 weight %, 0.85 weight %, 0.90 weight %, 0.95 weight % or 1 weight %.

In exemplary embodiments, the weight percent of dye system in the total composition may range from about 0.05 to about 0.5 weight %, in particular 0.25 weight %.

In one embodiment, the weight percent of dye system in the total composition is more than about 0.01 weight %.

In one embodiment, the weight percent of dye system in the total composition is less than about 1 weight %.

In one embodiment, the fourth temperature is at least 20° C.

In various embodiments, the fourth temperature may range from 20° C. to 60° C.

In various embodiments, the first temperature may be about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., about 55° C., about 56° C., about 57° C., about 58° C., about 59° C. or about 60° C.

In one embodiment, the fourth temperature is less than the melt temperature of said urease inhibitor of the type phosphoric triamide. This temperature is necessary not to degrade said urease inhibitor of the type phosphoric triamide, in particular nBTPT, upon addition said compound to the heated organic solvent of the type glycol.

In exemplary embodiments, in particular where nBTPT is used, the fourth temperature is 20° C.

In one embodiment, the fourth temperature is different from the second temperature.

In exemplary embodiments, the fourth temperature is identical to the second temperature. This implies that, upon adding the amount of dye system to the heated mixture of organic solvent of the type glycol and the urease inhibitor of the type phosphoric triamide, measures should be applied to level out a decrease or increase in the temperature of the resulting mixture, such as cooling or heating the resulting mixture.

(g) Forming the Composition

The composition according to the invention may be formed by adding the components in the order as specified:
in a first step, an amount of said organic solvent of the type glycol is heated to a first temperature at least above 20° C. but below the melt temperature of said urease inhibitor of the type phosphoric triamide;
in a second subsequent step, an amount of said urease inhibitor of the type phosphoric triamide is added (upon which it starts to dissolve) in said amount of organic solvent of the type glycol at a second temperature which is at most about equal to the first temperature;
in a third subsequent step, the liquid composition, obtained after the second step, is ultrasonically treated;
in a fourth subsequent step, the liquid composition, obtained after the second step, is kept at a third temperature, preferably between 60 and 80° C.;
optionally, an amount of a dye system is added to the liquid composition essentially consisting of an organic solvent of the type glycol and a urease inhibitor of the type phosphoric triamide at a fourth temperature.

The third and fourth step may be interchanged.

According to an exemplary embodiment, the method according to the invention comprises the steps of:
heating up an amount of propylene glycol to 35 to 50° C.;
adding 10 to 25 weight %, relative to the total weight of said liquid composition, of N-(n-butyl) thiophosphoric triamide (nBTPT) in said propylene glyco;
applying an ultrasonic treatment for 15 minutes;
maintaining said liquid composition essentially consisting of propylene glycol and nBTPT at 60 to 80° C., for example for about 120 minutes; and
optionally, adding 0.25 weight %, relative to the total weight of said liquid composition, of a dye system to said liquid composition essentially consisting of propylene glycol and nBTPT at least at 20° C.

The mixing may occur, for example, by stirring, blending, shaking, or rotating the constituents in a mixing device, or pumping and recirculating the liquid via a pump, e.g. over a heat exchanger used to control the right temperature of the mixture. The mixing may occur over the course of a few minutes to several hours, such as overnight. Exemplary mixing times are 2 hours.

(f) Liquid Composition

The present invention also provides a liquid composition essentially consisting of an organic solvent of the type glycol and a urease inhibitor of the type phosphoric triamide, and optionally a dye system, obtainable by a method for the manufacture of a liquid composition essentially consisting of an organic solvent of the type glycol and a urease inhibitor of the type phosphoric triamide, wherein the method comprises the step of heating an amount of said organic solvent of the type glycol to a first temperature at least above 35° C. but below the melt temperature of said urease inhibitor of the type phosphoric triamide, subsequently adding an amount of solid urease inhibitor of the type phosphoric triamide in said amount of organic solvent of the type glycol at a second temperature which is at most about equal to the first temperature, and subsequently:
i) maintaining the liquid composition essentially consisting of an organic solvent of the type glycol and a urease inhibitor of the type phosphoric triamide, and optionally a dye system, at a third temperature, which temperature is equal to or greater than the first temperature, preferably in the range of 60 to 80° C.; and/or
ii) subjecting the liquid composition essentially consisting of an organic solvent of the type glycol and a urease inhibitor of the type phosphoric triamide, and optionally a dye system, to an ultrasonic treatment.

The present invention also provides a liquid composition essentially consisting of an organic solvent of the type glycol and a urease inhibitor of the type phosphoric triamide, and optionally a dye system, having a crystallization temperature of the urease inhibitor of the type phosphoric triamide in said organic solvent of the type glycol of less than 0° C., in particular less than −2° C., preferably less than −4° C., more preferably less than −6° C., most preferably less than −8° C.

The present invention also provides a liquid composition essentially consisting of propylene glycol (PG), in particular propaan-1,2-diol, as a solvent and 10 to 20 weight % of N-(n-butyl) thiophosphoric triamide (nBTPT), in particular 15 to 18 weight %, more in particular about 17.5 weight %, relative to the total weight of the liquid solution.

The present invention also provides a liquid composition, essentially consisting of diethylene glycol monomethyl ether (DEGMME), diethylene glycol monobutyl ether (DEGMBE), or combinations thereof, optionally further including propylene glycol (PG), as a solvent and 10 to 40 weight % of N-(n-butyl) thiophosphoric triamide (nBTPT), in particular 15 to 30 weight %, more in particular about 25 weight %, relative to the total weight of the liquid solution.

(g) Fertilizer Products (g1) Solid Fertilizer Products

The present invention also provides a method for treating a solid particulate urea-based composition, in particular a urea-containing fertilizer, comprising at least a urea-based compound in particulate form. The method comprises contacting the solid particulate urea-based composition with a liquid composition essentially consisting of an organic solvent of the type glycol and a urease inhibitor of the type phosphoric triamide, in particular nBTPT, as obtained using the method according to the invention, or being a liquid composition essentially consisting of propylene glycol, diethylene glycol monomethyl ether (DEGMME), diethylene glycol monobutyl ether (DEGMBE), or combinations thereof as a solvent and N-(n-butyl) thiophosphoric triamide (nBTPT).

According to one embodiment, the liquid composition forms at least partially a coating on at least part of the urea-based compound in particulate form.

The liquid composition according to the invention may be added to any solid particulate urea-based composition, such as a urea-containing fertilizer. The liquid composition according to the invention may be added to the solid particulate urea-based composition during or after manufacture, using a fertilizer blender or other equipment that may be used to roll or blend the urea-containing composition with the liquid composition. A rotary device may tumble the urea-containing fertilizer and allow for uniform contact with the liquid composition without spillage. Auger, mixing screw and paddle mixers may also be used. Exposed inner surfaces of the mixing equipment may be clean, dry, and rust-free.

According to one embodiment, the liquid composition is incorporated in at least part of the urea-based compound in particulate form, for example, such as disclosed in U.S. Pat. No. 5,353,365 (Freeport-McMoRan Resource Partners, 1994).

According to one embodiment, the solid particulate urea-based compound is selected from the group of urea, urea calcium sulphate (UCaS), urea calcium nitrate (UCaN), urea magnesium nitrate (UMgN), urea calcium phosphate (UCaP), urea magnesium phosphate (UMgP), urea superphosphate (USP), urea calcium ammonium nitrate (UCAN), urea ammonium sulphate (UAS), urea ammonium phosphate (UAP), urea potassium salts (UK), urea-based compound NPK fertilizer, and mixtures thereof.

According to another embodiment, the solid particulate urea-based composition is a physical blend of a urea-based compound in particulate form, in particular such as the ones listed above, and one or more components selected from the group of nitrates, phosphates, sulphates and chlorides in particulate form, selected from the group of: ammonium nitrate, calcium nitrate, calcium ammonium nitrate, sodium nitrate, ammonium sulphate nitrate, potassium ammonium nitrate, ammonium phosphate, such as mono-ammonium phosphate (MAP) and di-ammonium phosphate (DAP), calcium bis(dihydrogenorthophosphate), super phosphate, triple superphosphate, rock phosphate, potassium sulphate, potassium magnesium sulphate, ammonium sulphate (AS), urea ammonium sulphate, urea calcium ammonium nitrate, urea ammonium sulphate, potassium chloride (MOP), potassium sulphate (SOP), urea potassium salts (UK), urea-based compound NPK fertilizer, or mixtures thereof.

The present invention also provides a solid particulate urea-based composition, comprising a solid particulate urea-based compound and the liquid composition according to the invention, wherein the liquid composition forms at least partially a coating on at least part of the particles comprising the urea-based compound.

(g2) Liquid Fertilizer Products

The present invention also provides a method for treating a liquid urea-based composition, in particular a urea-containing fertilizer, comprising at least a urea-based compound.

The method comprises intimately contacting the liquid urea-based composition with a liquid composition essentially consisting of an organic solvent of the type glycol and a urease inhibitor of the type phosphoric triamide, in particular nBTPT, as obtained using the method according to the invention, or being a liquid composition essentially consisting of propylene glycol, diethylene glycol monomethyl ether (DEGMME), diethylene glycol monobutyl ether (DEGMBE), or combinations thereof as a solvent and N-(n-butyl) thiophosphoric triamide (nBTPT).

According to one embodiment, the liquid composition is intimately mixed with the urea-based compound dissolved in a solvent, preferably in water, and using common mixing apparatus.

According to one embodiment, the liquid urea-based composition is an aqueous composition.

According to one embodiment, the liquid urea-based composition is obtained either as liquid composition of urea-based compounds, such as urea ammonium nitrate (UAN) or urea calcium nitrate (UCaN), which are usually insufficiently stable in solid form, or by dissolving a solid particulate urea-based compound in a suitable solvent, preferably water.

According to one embodiment, the solid particulate urea-based compound that is to be dissolved to obtain the liquid urea-based composition, is selected from the group of urea, urea calcium sulphate (UCaS), urea calcium nitrate (UCaN), urea magnesium nitrate (UMgN), urea calcium phosphate (UCaP), urea magnesium phosphate (UMgP), urea superphosphate (USP), urea calcium ammonium nitrate (UCAN), urea ammonium sulphate (UAS), urea ammonium phosphate (UAP), urea potassium salts (UK), and mixtures thereof.

According to another embodiment, further compounds may be dissolved in the liquid urea-based composition. Said one or more components are selected from the group of nitrates, phosphates, sulphates and chlorides in particulate form, selected from the group of: ammonium nitrate, calcium nitrate, calcium ammonium nitrate, sodium nitrate, ammonium sulphate nitrate, potassium ammonium nitrate, ammonium phosphate, such as mono-ammonium phosphate (MAP) and di-ammonium phosphate (DAP), calcium bis (dihydrogenorthophosphate), super phosphate, triple superphosphate, rock phosphate, potassium sulphate, potassium magnesium sulphate, ammonium sulphate (AS), urea ammonium sulphate, urea calcium ammonium nitrate, urea ammonium sulphate, potassium chloride (MOP), potassium sulphate (SOP), urea potassium salts (UK), urea-based compound NPK fertilizer, or mixtures thereof.

Preferably, the dissolved urea-based compound is selected from the group of urea, urea ammonium nitrate (UAN), urea calcium nitrate (UCaN) or mixtures thereof.

(h) Application

The liquid composition essentially consisting of an organic solvent of the type glycol and a urease inhibitor of the type phosphoric triamide can be used in a urea-containing fertilizer, being either in the form of a liquid or a solid. The urea-containing composition for use as a fertilizer may be spread across the top of the soil using a spreader truck or an airflow truck.

The urea-containing fertilizer containing the liquid composition may be used for any nitrogen-consuming plants including, for example, row crops, specialty crops, pastures, sod farms, turf grass, ornamentals, and other landscape or nursery plantings. The liquid composition may be used with urea-containing fertilizers applied to the surface during pre-plant, preemergence, side-dress, top-dress, broadcast, or other post-planting applications. Without wishing to be bound by theory, the liquid composition beneficially retards the hydrolysis of urea, controls volatility of the fertilizer once applied, and prevents ammonia loss while the urea is on the soil surface.

A skilled person would recognize that the rate of application for urea-containing fertilizers and the liquid compositions is affected by many environmental factors, many of which contribute to fertilizer volatilization. Without wishing to be bound by theory, the factors increasing volatilization that should be considered when choosing the appropriate rate include high soil moisture; drying conditions including low humidity, sun and wind; high air and soil temperatures; high soil pH; low organic matter content in the soil; low cation-exchange capacity (CEC) soil; high amounts of crop residue; and the length of control needed.

In other embodiments, the liquid composition according to the invention may be added to fertilizers and wastes of animal origin, such as excrement or manure, to decrease nitrogen loss and odour formation.

In still other embodiments, the liquid composition may also be added into sprays that mask animal urine odours.

Definitions

The compounds described herein may have asymmetric centres.

The term "liquid" refers to a solution, suspension, or an emulsion that is fluid under ambient conditions. Generally, the liquid compositions are liquid (as opposed to solid) from at least about −20° C. to at least about 60° C., such as from about 0° C. to about 40° C., or from about 10° C. to about 30° C.

Compounds of the present invention containing an asymmetrically substituted atom may be isolated in optically active or racemic form. All chiral, diastereomeric, racemic forms and all geometric isomeric forms of a structure are intended, unless the specific stereochemistry or isomeric form is specifically indicated.

The term "acyl," as used herein alone or as part of another group, denotes the moiety formed by removal of the hydroxy group from the group COOH of an organic carboxylic acid, e.g., RC(O)—, wherein R is $R^a$, $R^aO—$, $R^aR^bN—$, or $R^aS—$, wherein $R^a$ is hydrocarbyl, heterosubstituted hydrocarbyl, or heterocyclo, and $R^b$ is hydrogen, hydrocarbyl, or substituted hydrocarbyl.

The term "alkyl" as used herein describes groups which are preferably lower alkyl, containing from one to eight carbon atoms in the principal chain and up to 20 carbon atoms. They may be straight or branched chain or cyclic and include methyl, ethyl, propyl, isopropyl, butyl, hexyl and the like.

The term "alkenyl" as used herein describes groups which are preferably lower alkenyl, containing from two to eight carbon atoms in the principal chain and up to 20 carbon atoms. They may be straight or branched chain or cyclic and include ethenyl, propenyl, isopropenyl, butenyl, isobutenyl, hexenyl, and the like.

The term "alkynyl" as used herein describes groups which are preferably lower alkynyl containing from two to eight carbon atoms in the principal chain and up to 20 carbon atoms. They may be straight or branched chain and include ethynyl, propynyl, butynyl, isobutynyl, hexynyl, and the like.

The term "aromatic" as used herein alone or as part of another group denotes optionally substituted homo- or heterocyclic conjugated planar ring or ring system comprising delocalized electrons. These aromatic groups are preferably monocyclic (e.g., furan or benzene), bicyclic, or tricyclic groups containing from 5 to 14 atoms in the ring portion. The term "aromatic" encompasses "aryl" groups defined below.

The terms "aryl" or "Ar" as used herein alone or as part of another group denote optionally substituted homocyclic aromatic groups, preferably monocyclic or bicyclic groups containing from 6 to 10 carbons in the ring portion, such as phenyl, biphenyl, naphthyl, substituted phenyl, substituted biphenyl, or substituted naphthyl.

The terms "halogen" or "halo" as used herein alone or as part of another group refer to chlorine, bromine, fluorine, and iodine.

The term "heteroatom" refers to atoms other than carbon and hydrogen.

The terms "heterocycle" or "heterocyclic" as used herein alone or as part of another group denote optionally substituted, fully saturated or unsaturated, monocyclic or bicyclic, aromatic or non-aromatic groups having at least one heteroatom in at least one ring, and preferably 5 or 6 atoms in each ring. The heterocyclic group preferably has 1 or 2 oxygen atoms and/or 1 to 4 nitrogen atoms in the ring, and is bonded to the remainder of the molecule through a carbon or heteroatom.

When introducing elements of the present invention or the embodiments(s) thereof, the articles "a," "an," "the," and "said" are intended to mean that there are one or more of the elements. The terms "comprising," "including," and "having" are intended to be inclusive and mean that there may be additional elements other than the listed elements.

Having described the invention in detail, it will be apparent that modifications and variations are possible without departing from the scope of the invention defined in the appended claims.

EXAMPLES

The following examples are included to demonstrate certain embodiments of the invention. It should be appreciated by the skilled person that the techniques disclosed in the examples represent techniques discovered by the inventors to function well in the practice of the invention. The skilled person should, however, in light of the present invention, appreciate that many changes can be made in the specific embodiments that are disclosed and still obtain a like or similar result without departing from the spirit and scope of the invention, therefore all matter set forth is to be interpreted as illustrative and not in a limiting sense.

VOLATILIZATION MEASUREMENTS

Figure 1:
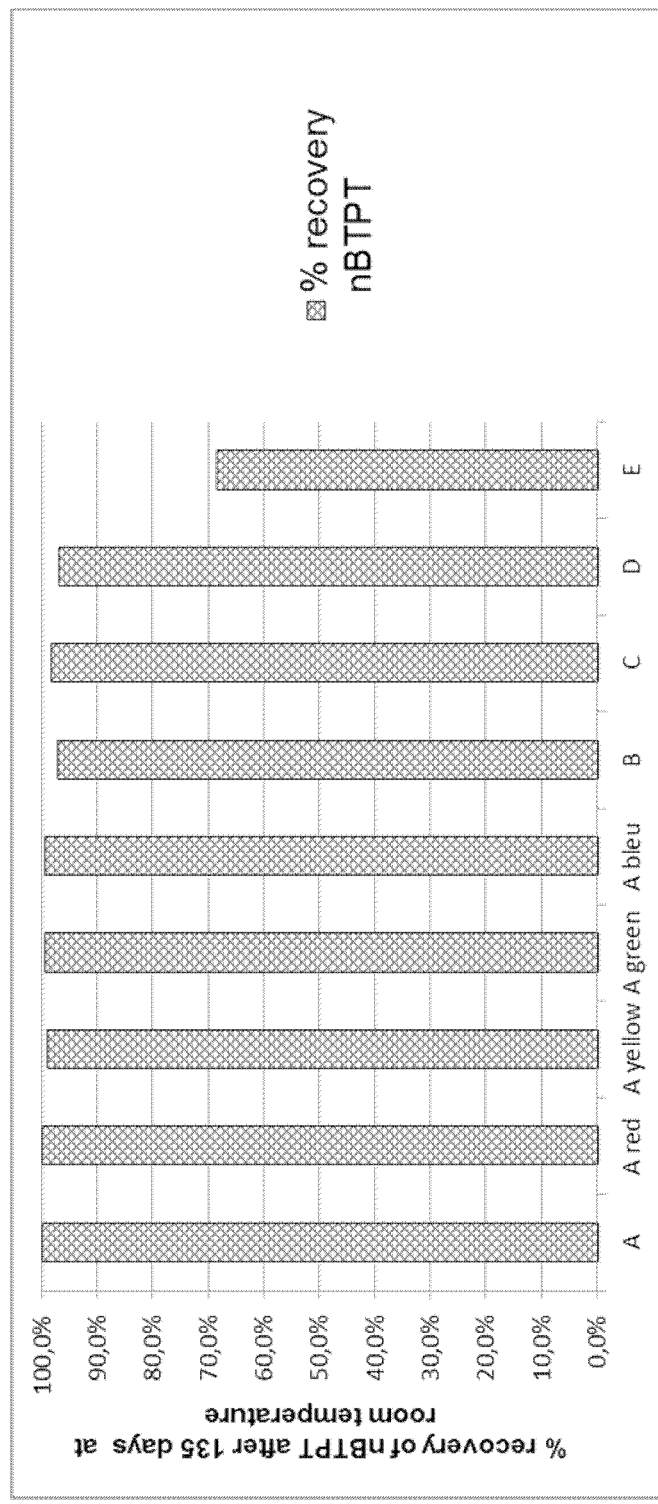
FIG. 1: Stability of nBTPT in different liquid nBTPT solutions with storage in closed plastic containers at room temperature (20° C.) after 135 days of storage at room temperature. [A=25% nBTPT in PG, A red=A+Duasyn Brilliant Red F3B-SF, A yellow=A+Tartrazine Supra Liquid, A green=A+Keyacid™ Green B, A bleu=A+VI Turquoise E-VS 300%, B=Agrotain® Ultra, C=Rhodia Ag-Rho™ N Protect B, D=BASF Limus, E=N Yield™].

Erlenmeyer flasks were filled with 300 g air-dried, arable topsoil, irrigated to a desired % of its WHC (Water Holding Capacity), incubated for 6 days prior to the application of the fertilizers. Fertilizers (2.5-3.15 mm granule size) at a concentration of 100 mg N (Nitrogen)/flask were applied over the soil surface. Boric acid traps were installed to catch volatile ammonia from the air above the topsoil, and the Erlenmeyer flasks were installed in a Phytotron chamber at 25° C. at windy but not dry conditions.

Measurements:
Titration of boric acid traps 3, 7, 10, and 14 days after fertilizer application;
Calculation of cumulative N loss, and N loss reduction in comparison to urea;
Soil pH at the beginning of the trial;
mineral N ($NH_4$ and $NO_3$) and total soluble N at the end of trial;
Urea-N calculated as difference between N total and N mineral.

nBTPT Experiments nBTPT, as powder or as liquid formulations, was mixed in urea in the following way: nBTPT was added to urea melt and subsequently, this mixture was granulated in a fluidized bed granulator.

For lab scale experiments, nBTPT was applied onto urea by adding 1.2 kg of urea-based compound to a lab scale drum. In a next step, the nBTPT material was slowly added. A residence time of 10 minutes was applied and the rotating speed of the drum was consequently the same in each experiment. Larger scale experiments with amounts up to 40 kg of fertilizer material were performed in a concrete mixer.

The samples were stored under several conditions, dependent on the type of samples:
Bagged at room temperature (20° C.) or in a Nissen hut (an unconditioned bulk storage hall)
Open to air in a Nissen hut For some samples, an accelerated stability test was done storing these samples at elevated temperatures:
Oven of 30° C. closed plastic container
Oven of 30° C. open to air
30° C./60% RH open to air
70° C. closed plastic container Typically, a day/night cycle is generated in the Nissen hut, with temperature fluctuations between 0 to 42° C. and fluctuations of relative humidity between 20 and 90%, which can be compared with real life storage in silos.

Determination of Stability of nBTPT

HPLC Analysis of nBTPT-Content

HPLC analysis of nBTPT is done as described in the procedure CEN 15688-2007.

Products

Solid N-(n-butyl)thiophosphoric triamide was obtained from Sunfit Chemical Co. (China) (CAS-Nr. 94317-64-3), as a white crystalline solid with a melting point of 58-60° C.

Propylene glycol was obtained from Amresco (a VWR company) (CAS-Nr. 57-55-6), as colourless, odourless viscous liquid with a boiling point of 188.2° C.

Diethylene glycol monomethyl ether (DEGMME) was obtained from VWR chemicals and reagents Merck (CAS-Nr. 111-77-3), as colourless, odourless viscous liquid with a boiling point of 190-196° C.

Diethylene glycol monobutyl ether (DEGMBE) was obtained from VWR chemicals and reagents Merck (CAS-Nr. 111-34-5), as colourless, odourless viscous liquid with a boiling point of 226-234° C.

The flash point of propylene glycol is 130° C. For comparison, the flash point of Agrotain® is 81.1° C., which is considerably lower.

The toxicity oral rat LD50 is 20000 mg/kg for propylene glycol, 6450 mg/kg for DEGMME and 5660 mg/kg for DEGMBE. For comparison, the toxicity of NMP (major solvent in Agrotain) oral rat LD50 is 3914 mg/kg, which is considerably lower.

Ultrasonic Treatment

The ultrasonic treatment was conducted using an Elmasonic S 180 H (Elma Ultrasonic, Ruislede, Belgium) using 37 kHz ultrasonic frequency at variable powers.

Example 1—Formulations of nBTPT in Propylene Qlycol

At room temperature (20° C.)

When solid nBTPT was added to propylene glycol (PG) at room temperature, nBTPT tends to stick together with the formation of flocs. At room temperature, it was possible to dissolve about 41.5 g of nBTPT in 102.5 g of PG in 2 hours (about 29 weight %). Nevertheless, 2 hours is quite long and after this period, still some flocs of nBTPT remained undissolved in PG. When an extra amount of 10 g of nBTPT was added to the same solution, most of the nBTPT dissolved after some hours, but a viscous cloudy liquid was still obtained with the presence of undissolved flocs.

When about 12 g N-methylpyrrolidine (NMP, additive in Agrotain®) was added, a clear solution was directly formed after just some minutes, with no need of specific temperature range. This indicates NMP has a positive effect on the solubility of nBTPT in PG, as is also disclosed in EP 0 869 933 A1. NMP's toxicity represents nevertheless a major drawback, both for the user, e.g. the farmer, and for the environment.

At Elevated Temperature:

It was observed that solid nBTPT dissolves in PG much faster at elevated temperatures and without the flocs issue when the nBTPT material tends to stick together and to remain that way. Surprisingly, it was also observed that such a solution of nBTPT in PG, when prepared at a higher temperature and kept at a high temperature for a period of time, remained stable at room temperature (20° C.). Noteworthy, as the melting point of nBTPT is 58 to 60° C., all solubility tests were performed at temperatures between 40 to 60° C. When 50 g of PG was heated to 45° C., it was possible to dissolve up to 43.5 g nBTPT (=about 46 weight % solution). When increasing the temperature to 60° C., 100 g of nBTPT could be added (66.6 weight % solution). Unfortunately, when the aforementioned mixture cooled down, the solution crystallized immediately, indicating that these highly concentrated solutions are not stable at room temperature (defined herein as a temperature of 20° C.).

However, a subsequent experiment showed that a maximum concentration of about 45 weight % of nBTPT in PG is still allowable to obtain a solution which remains liquid and stable at room temperature upon cooling down and which did not crystallize.

When nBTPT was melted first (it turns into clear solution) and was subsequently mixed with PG (either at room temperature or at elevated temperature), some gas evolution was visible. Via this method, a 33 weight % solution of nBTPT in PG could be prepared, but some small flocs still remained in the solution. Hence, it was concluded that nBTPT is not preferably used in a molten form to dissolve in PG.

All further experiments were done using a 25 weight % solution of nBTPT in PG, prepared by dissolving solid nBTPT in PG at 40-45° C.

It was also observed that by using an ultrasonic bath treatment at any temperature nBTPT is solved much faster in PG, possibly due to the fact that the ultrasonic waves break up the formed flocs of nBTPT.

Finally, 100 mg of several dye systems were added to 40 g of a 25% nBTPT solution in PG and evaluated (0.25%):
  Duasyn Brilliant Red F3B-SF (Clariant, water-based red dye solution)
  Tartrazine Supra Liquid (Keystone, water-based yellow dye solution)
  Keyacid™ Green B (Keystone, green dye powder)
  VI Turquoise E-VS 300% (Vision Chemicals Ltd, bleu dye powder)

Different solutions were prepared (Table 1a) and compared with prior art commercially available solutions, of which the composition is given in Table 1b. Data related to commercial solutions were extracted from published data such as product safety data sheets.

TABLE 1a

Different solutions of PG with nBTPT

| Sample code | nBTPT amount | Dye system |
|---|---|---|
| A | 25% | none |
| A red | 25% | Duasyn Brilliant Red F3B-SF |
| A yellow | 25% | Tartrazine Supra Liquid |
| A green | 25% | Keyacid ™ Green B |
| A bleu | 25% | VI Turquoise E-VS 300% |
| | | Commercial name |
| B | 26.7% | Agrotain ® Ultra (Koch, US) |
| C | 25.5-27.5% | Rhodia Ag-Rho ™ N Protect B (Solvay, Germany) |
| D | 19.5% + 6.5% nPPT | BASF Limus (BASF, Germany) |
| E | 20% | N Yield ™ (Eco Agro, The Netherlands) |

TABLE 1B

Commercial solutions of nBTPT

| Commercial product | Composition of solvent (amounts relative to the total solution) |
|---|---|
| Agrotain ® Ultra | 40-70% propylene glycol, 10-30% N-methylpyrrolidone, 1-5% dye system |
| Rhodia Ag-Rho ™ N Protect B | 71-75% 2,2-dimethyl-1,3-dioxolan-4-yl methanol |
| BASF Limus | <40% benzyl alcohol, <25% polyethylene imine, <2% Orasole Orange 251, <2% 3,7-dimethyloct-6-enenitrile |
| N Yield ™ | 40-70% propylene glycol, 20-40% DMSO |

Example 2—Stability of nBTPT in Solutions

The stability of nBTPT in the above listed solutions was followed over time when stored at room temperature. The results are summarized in FIG. 1. All formulations seems to be very stable at room temperature, with almost a full recovery after 135 days of storage (except for N Yield™). nBTPT in PG seems to have similar or even higher stability then Agrotain® Ultra and BASF Limus. The addition of a dye system does not seem to have a big effect on the nBTPT stability.

Figure 2:
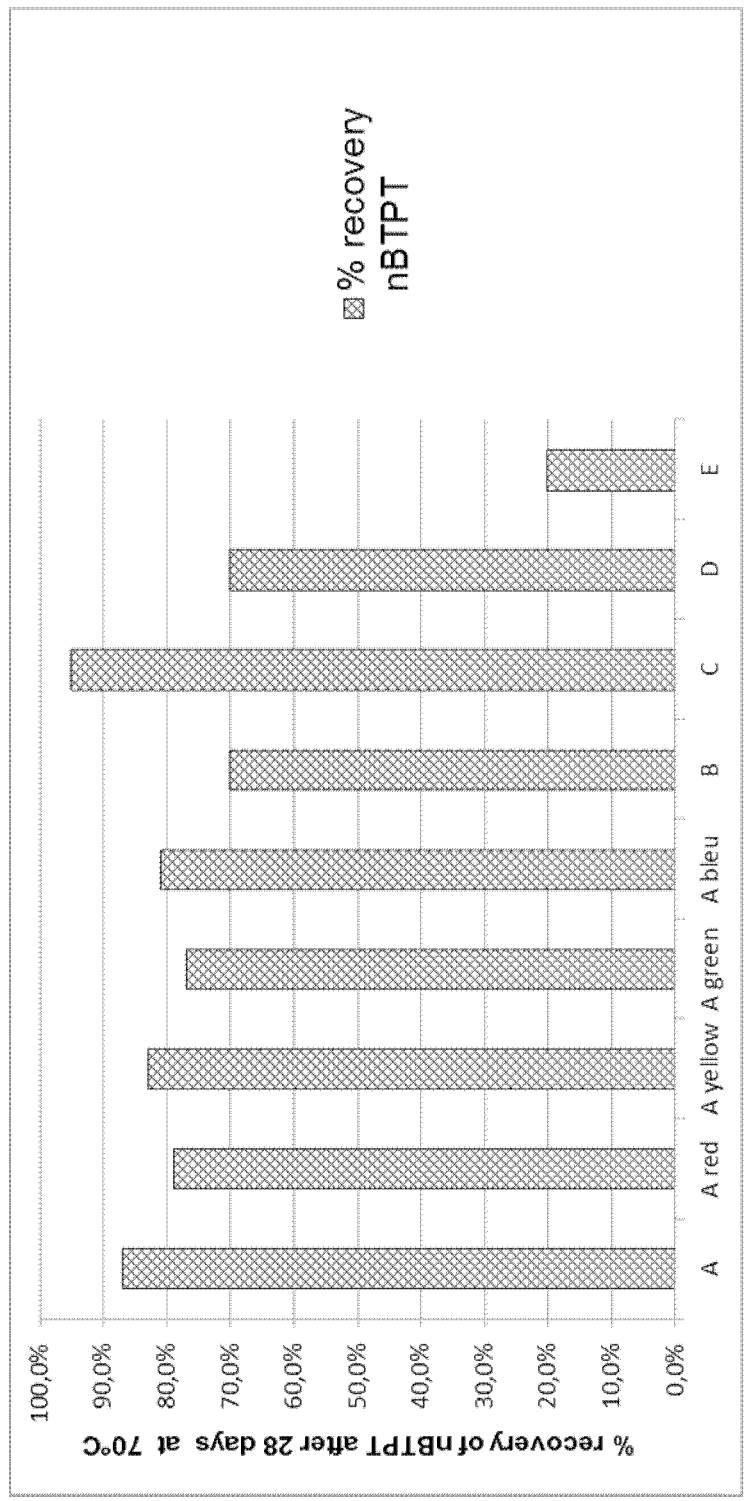
FIG. 2: Stability of nBTPT in different liquid nBTPT solutions with storage in closed plastic containers at 70° C. (forced aging) after 28 days. [A=25% nBTPT in PG, A red=A+Duasyn Brilliant Red F3B-SF, A yellow=A+Tartrazine Supra Liquid, A green=A+Keyacid™ Green B, A bleu=A+VI Turquoise E-VS 300%, B=Agrotain® Ultra, C=Rhodia Ag-Rho™ N Protect B, D=BASF Limus, E=N Yield™].

Further stability tests were performed at 70° C. to simulate a long term storage by accelerating the decomposition rate and also to simulate extreme storage conditions that can occur in certain hot climates with the storage tank for nBTPT in PG, directly exposed to solar radiation. The samples according to Table 1 were kept in an oven at 70° C. in closed plastic containers. Sampling was done on day 28. The results are summarized in FIG. 2. All formulations seemed to be stable at 70° C., with a recovery of more than 70% after 28 days (except for N Yield™: 22%). Rhodia Ag-Rho™ N Protect B seems to have the highest nBTPT stability at 70° C. nBTPT in PG seems to have similar or even higher stability then Agrotain® Ultra and BASF Limus. The addition of colorants does not have a large effect on the nBTPT stability.

Example 3—Crystallization Stability of nBTPT in Glycol Type Solvents at Lower Temperatures To determine the crystallization temperature of nBTPT in glycol type solvents at different concentrations, a water bath was cooled to −12° C. and the crystallization temperature was measured with a thermometer while stirring, for several samples. A first set (with different concentrations of nBTPT) was obtained after an ultrasonic treatment of the liquid composition, containing essentially PG and nBTPT, at room temperature (20° C.). A second set (with different concentrations of nBTPT) was obtained after maintaining the liquid composition containing essentially PG and nBTPT at 70° C. for about 2 hours. The results are shown in Table 2 for two sets of samples.

TABLE 2

| | Crystallization temperature (° C.) | |
|---|---|---|
| | Ultrasonic treatment at 20° C. | Storage at 70° C. for 2 hours |
| 15% nBTPT in PG | −4.4 | −9.7 |
| 17.5% nBTPT in PG | −4.6 | −6.4 |
| 20% nBTPT in PG | 2.8* | −0.1 |
| 25% nBTPT in PG | 9.3* | 6.5* |
| 30% nBTPT in PG | 14.3* | 9.8* |

For comparison: the crystallisation point of Agrotain® Ultra as such at room temperature was determined to be −14.8° C., which is still considerably lower than either of the two treatments outlined above in Table 2. Results marked as * are outside the scope of the invention.

A solution of 17.5% nBTPT in PG was made at different temperatures and the crystallization temperature was measured. In the first test, a big batch was made and treated first by using ultrasonic bath at room temperature and afterwards the solution was heated to the specified temperature. In a second batch, the solution was made without the additional ultrasonic treatment (Table 3).

TABLE 3

| 17.5% nBTPT | | |
|---|---|---|
| Ultrasonic treatment | Thermal treatment | Crystallization temperature (° C.) |
| ultrasonic treatment at 20° C. | Subsequent thermal treatment at 20° C., 15 min | −4.6 |
| ultrasonic treatment at 20° C. | Subsequent thermal treatment at 40° C., 15 min | −8.8 |
| ultrasonic treatment at 20° C. | Subsequent thermal treatment 55° C., 15 min | −10.3 |
| no ultrasonic treatment | thermal treatment at 40° C., 15 min | −4.5 |
| no ultrasonic treatment | thermal treatment 55° C., 15 min | −4.6 |

There is clearly an additive effect of the heating and ultrasonic treatment method on the crystallization temperature. As an extra step in the preparation procedure of the solutions of nBTPT in PG, said heating above 40° C. is recommended.

Next to PG, other glycol type solvents were tested: DEGMME and DEGMBE (also in combination with PG). Solutions of 25.0% nBTPT were prepared by heating to 45° C. and stirring until a clear solution was achieved. Crystallization temperature was measured (Table 4). Noteworthy, lower crystallization temperatures were measured for these solvents in comparison to 25% nBTPT in pure PG. Nevertheless, DEGMME and DEGMBE have a higher toxicity level then PG.

TABLE 4

| | Crystallization temperature (° C.) Heated at 45° C. |
|---|---|
| % nBTPT in DEGMME | <−10 |
| % nBTPT in DEGMBE | <−10 |
| % nBTPT in DEGMBE/PG 1:1 | <−10 |

Example 4—Stability of nBTPT in Propylene Glycol (PG) on Urea

Figure 3:
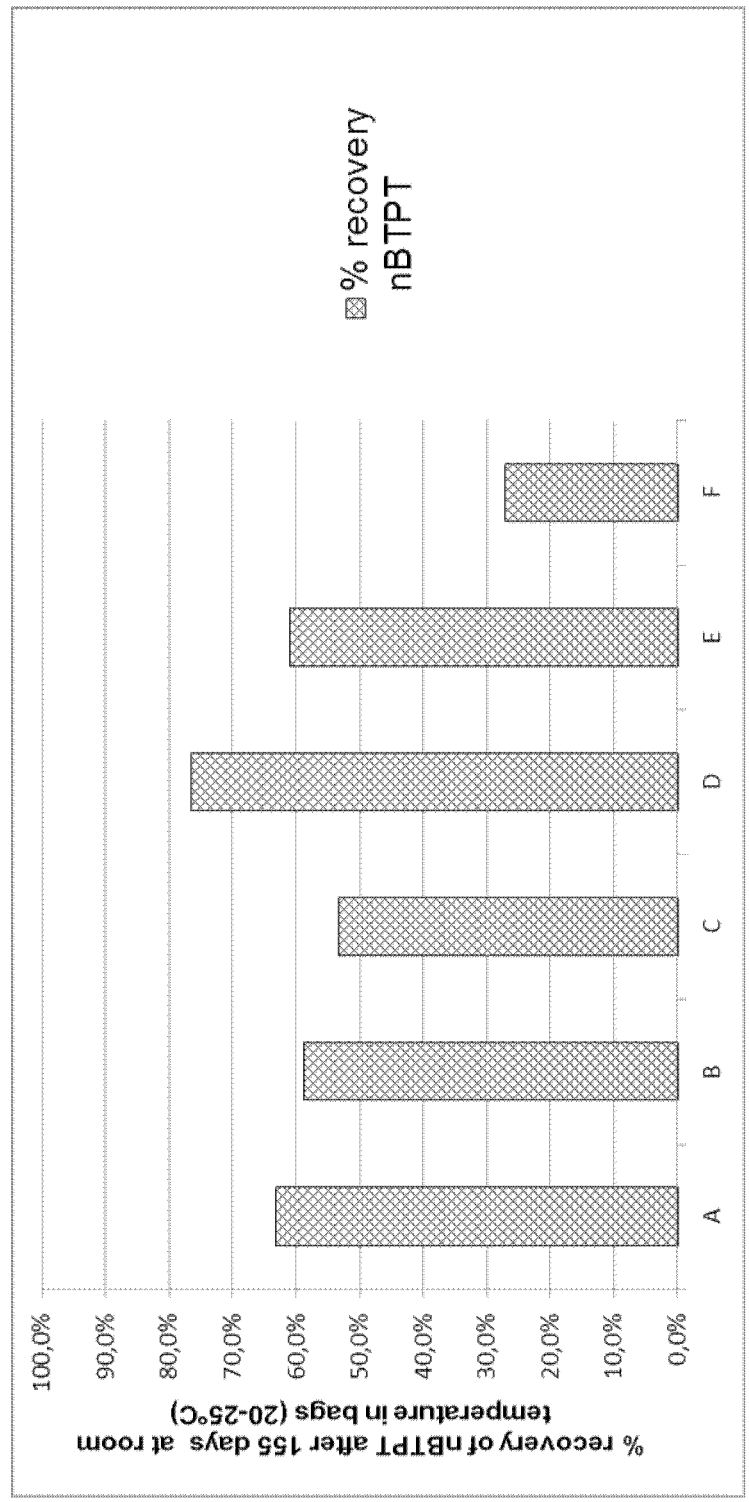
FIG. 3: Stability of nBTPT in different liquid nBTPT solutions on urea with storage in closed plastic containers at room temperature (20° C.) after 155 days. [A=25% nBTPT in PG on urea, B=Agrotain® Ultra on urea, C=Rhodia Ag-Rho™ N Protect B on urea, D=BASF Limus on urea, E=N Yield™ on urea, F=nBTPT powder on urea].

For this experiment, urea granules were coated with 500 ppm of the liquid composition according to the invention and several available commercial sources of nBTPT (see Table 1a). Subsequently, the granules were stored for 155 days under bagged conditions at room temperature and the decomposition of nBTPT was followed. The results are shown in FIG. 3.

Overall, all nBTPT sources on urea granules seem to have a high stability under bagged storage conditions, with a half-life of more than 5 months. nBTPT in BASF Limus seems to have the highest stability on urea under bagged conditions at room temperature, with about 24% of nBTPT degradation in 155 days. nBTPT in propylene glycol showed a comparable stability when compared with the commercially available liquid formulations of nBTPT (except BASF Limus), and showed a 40% nBTPT degradation in 155 days. nBTPT applied as powder seems to have the lowest stability with about 75% of nBTPT degradation in 155 days. This experiment has shown that a urea, coated with 500 ppm of a 25 weight % nBTPT solution in PG as manufactured according to the method of the invention, performs as good as any commercial solution, except for the product BASF Limus.

As a further experiment, the stability of nBTPT on urea was determined using accelerated stability tests under more severe conditions with storage in jars open to air in an unclimatised Nissenhut for 80 days.

Figure 4:
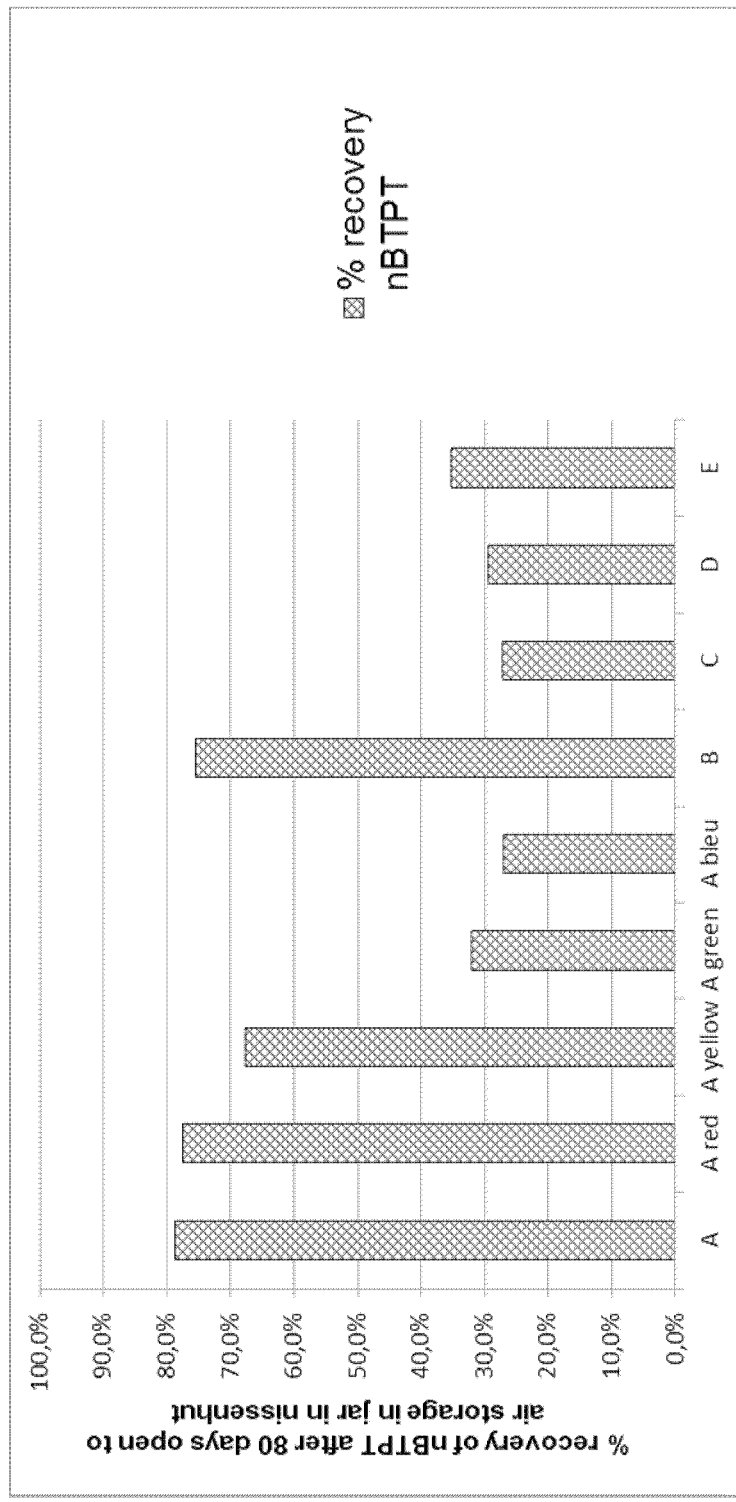
FIG. 4: Stability of nBTPT in different liquid nBTPT solutions on urea with storage in open containers in a Nissen hut (an unconditioned bulk storage hall) after 80 days. [A=25% nBTPT in PG on urea, A red=A+Duasyn Brilliant Red F3B-SF, A yellow=A+Tartrazine Supra Liquid, A green=A+Keyacid™ Green B, A bleu=A+VI Turquoise E-VS 300%, B=Agrotain® Ultra on urea, C=Rhodia Ag-Rho™ N Protect B on urea, D=BASF Limus on urea, E=N Yield™ on urea].

The results are shown in FIG. 4. The use of the liquid composition according to the invention, in particular 25 weight % of nBTPT in propylene glycol, seems to give similar stability than Agrotain® Ultra and even higher stability than Rhodia Ag-Rho™ N Protect B, BASF Limus and N Yield™ at these specific storage conditions. Remarkably, the addition of the green and blue dye to 25% nBTPT in PG had a negative effect on the stability of nBTPT on urea at these specific storage conditions.

A standard quality analysis of urea granules, coated with nBTPT in several forms, also showed that the liquid composition according to the invention is at least as performant than the commercially available sources. An overview of the analysis results is given in Table 5 below.

Overall, all nBTPT sources in urea granules seem to have a high stability under bagged storage conditions with a recovery of nBTPT>85% after 85 days of storage. nBTPT in propylene glycol showed a comparable or even higher stability when compared with the commercially available liquid formulations of nBTPT. This experiment has shown that a urea, internally treated with 500 ppm of a 25 weight % nPTBT solution in PG as manufactured according to the method of the invention, performs as good or even better as any commercial solution.

TABLE 5

| Nr. | Composition | moisture content | pH | Caking Index at 27° C. | Crushing Strength | Impact Resistance | Abrasion dust formation | Monolayer[a] |
|---|---|---|---|---|---|---|---|---|
| 1 | BASF Limus on urea | 0.18 | 9.1 | 30 | 4.1 | 0.9 | 50 | 1.3 |
| 2 | N-Yield ™ on urea | 0.18 | 9.1 | 46 | 4.2 | 0.9 | 150 | 1.6 |
| 3 | Agrotain ® Ultra on urea | 0.17 | 9.3 | 25 | 4.3 | 1.0 | 75 | 1.3 |
| 4 | Rhodia Ag-Rho ™ N Protect B on urea | 0.16 | 8.5 | 42 | 4.4 | 0.9 | 200 | 1.0 |
| 5 | nBTPT powder on urea | 0.17 | 9.4 | 23 | 4.4 | 0.8 | 225 | 1.1 |
| 6 | 25% nPTBT in PG on urea | 0.19 | 8.1 | 39 | 4.3 | 0.8 | 200 | 1.5 |

[a]Moisture absorption of a monolayer of product in 24 h, exposed to 20° C. and 80% relative humidity.

Experiment 5—Odour

The odour was determined for all nBTPT sources as such, applied onto urea granules in a concentration of 500 ppm. A qualitative overview is given in Table 6.

TABLE 6

| Urease inhibitor | Smell of the nBTPT formulation | Smell from granules | Remark |
|---|---|---|---|
| BASF Limus | strong | none | very intensive odour |
| N Yield ™ | strong | strong | DMSO smell |
| Agrotain ® Ultra | strong | strong | very intensive odour |
| Rhodia Ag-Rho ™ N Protect B | medium | light | |
| nBTPT powder | strong | none | |
| 25% nBTPT in propylene glycol | light | none | |

All nBTPT sources have a significant smell/odour. However, compared to the commercial sources, the liquid composition according to the invention has a light odour as such and no significant odour when applied onto urea granules.

Example 6—Stability of nBTPT in Propylene Qlycol in Urea

Figure 5:
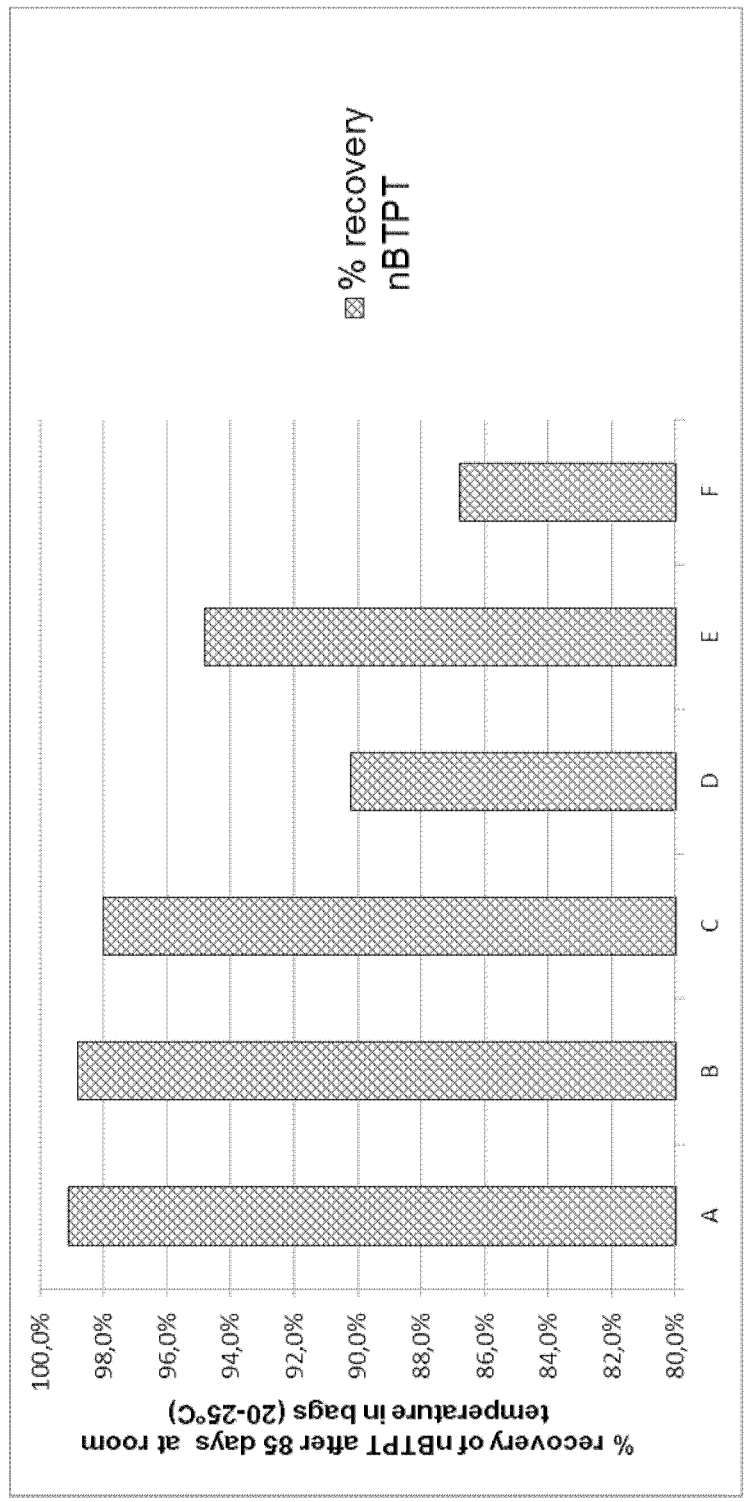
FIG. 5: Stability of nBTPT in different liquid nBTPT solutions in urea with storage in bags at room temperature (20° C.) for 85 days. [A=25% nBTPT in PG in urea, B=Agrotain® Ultra in urea, C=Rhodia Ag-Rho™ N Protect B in urea, D=BASF Limus in urea, E=N Yield™ in urea, F=nBTPT powder in urea].

For this experiment, the liquid composition of nBTPT according to the invention and also several available commercial sources of nBTPT were evaluated for the addition to urea via the urea melt in a fluidized bed granulator. Subsequently, the granules were stored for 85 days under bagged conditions at room temperature and the decomposition of nBTPT was followed. The results are shown in FIG. 5.

A standard quality analysis of urea granules, internally doped with nBTPT in several forms, also showed that the liquid composition according to the invention is at least as performant than the commercially available sources when mixed in a urea melt. An overview of the analysis results is given in Table 7 below.

TABLE 7

| Nr. | Composition | moisture content | pH | Caking Index at 27° C. | Crushing Strength | Impact Resistance | Abrasion dust formation |
|---|---|---|---|---|---|---|---|
| 1 | BASF Limus in urea | 0.15 | 8.9 | 23 | 4.4 | 0.9 | 125 |
| 2 | N-Yield ™ in urea | 0.15 | 8.9 | 13 | 4.2 | 1.0 | 1000 |
| 3 | Agrotain ® Ultra in urea | 0.09 | 9.1 | 25 | 3.9 | 1.3 | 975 |
| 4 | Rhodia Ag-Rho ™ N Protect B in urea | 0.2 | 8.9 | 44 | 4.3 | 0.7 | 425 |
| 5 | nBTPT powder in urea | 0.28 | 8.1 | 42 | 3.8 | 0.9 | 825 |
| 6 | 25% nPTBT in PG in urea | 0.08 | 9.1 | 30 | 4.0 | 0.91 | 525 |

Example 7—Volatilization Control of nBTPT in Propylene Glycol on Urea

Figure 6:
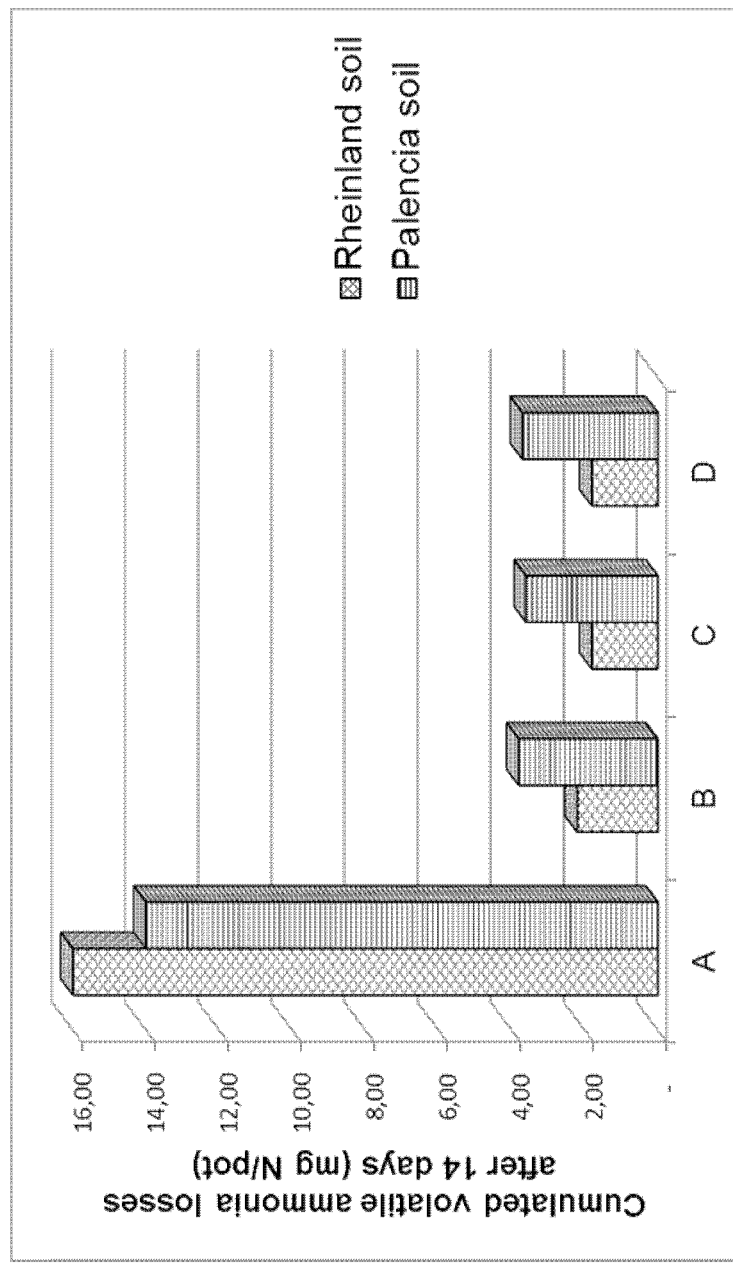
FIG. 6: Cumulated volatile ammonia losses (mg N/pot) on Rheinland soil (pH 6.5) and Palencia soil (pH 7.5). [A=urea; B=400 ppm nBTPT as 25% nBTPT in PG on urea, C=475 ppm nPPT/nBTPT as BASF Limus on urea, D=400 ppm nBTPT powder on urea].

In this experiment, the liquid composition of nBTPT according to the invention and also several available commercial sources of nBTPT were applied on urea and the volatilization was measured on Rheinland soil and Palencia soil in a volatilization experiment. FIG. 6 shows the cumulated volatile ammonia losses (mg N/pot) on Rheinland soil (pH 6.5) and Palencia soil (pH 7.5) of nontreated urea versus urea coated with the liquid composition of nBTPT according to the invention and also several available commercial sources of nBTPT. The obtained date showed no statistically significant difference in urease inhibitory activity and volatilization control between nBTPT powder, BASF Limus and nBTPT in propylene glycol.

This experiment also has shown that a urea, coated with 400 ppm of a 25 weight % nPTBT solution in PG as manufactured according to the method of the invention, performs as good or even better as any commercial solution.

Experiment 8: Production of a Commercial Batch

The following 1000 litre batch was produced:

| Propylene glycol | 866.2 kg |
|---|---|
| nBTPT (purity: about 98%) | 188.2 kg (17.5%) |
| Duasyn Brilliant Red F3B-SF Liquid | 2.6 kg |
| Total | 1057.0 kg |

Protocol
1. Charge a vessel with 866.2 kg propylene glycol.
2. Start stirrer and heat to 40-45° C.
3. Charge 188.2 kg of nBTPT gradually whilst maintaining the temperature at 40-45° C.
4. Mix for 15 minutes after last powder addition.
5. Check nBTPT is fully dissolved; if undissolved powder is present, mix for 10 minutes and re-check.
6. Cool to 20° C.
7. Add 2.6 kg Duasyn Brilliant Red F3B-SF Liquid.
8. Mix for 5 minutes.

Target specification:

| Appearance: | clear red solution |
|---|---|
| Density at 20° C.: | 1.057 kg/l (allowable range: 1.054-1.060 kg/l) |
| pH (Neat) | 7.5-8.0 |
| nBTPT content | 17.5% w/w = 18.5% w/v = 185 g/l |

The invention claimed is:

1. A method for the manufacture of a liquid composition essentially consisting of propylene glycol (PG), optionally diethylene glycol monomethyl ether (DEGMME), diethylene glycol monobutyl ether (DEGMBE), or combinations thereof, and a urease inhibitor of the type phosphoric triamide, and optionally a dye system, the method comprising the step of heating an amount of propylene glycol (PG) to a first temperature at least above 20° C. but below the melt temperature of said urease inhibitor of the type phosphoric triamide, and subsequently adding an amount of solid urease inhibitor of the type phosphoric triamide in said amount of propylene glycol (PG) at a second temperature which is at most about equal to the first temperature, characterized in that the method comprises the step of
   i) maintaining the liquid composition essentially consisting of propylene glycol (PG), optionally diethylene glycol monomethyl ether (DEGMME), diethylene glycol monobutyl ether (DEGMBE), or combinations thereof, and a urease inhibitor of the type phosphoric triamide, and optionally a dye system, at a third temperature, which temperature is greater than the first temperature, in the range of 60 to 80° C., wherein the crystallization temperature of the urease inhibitor of the type phosphoric triamide in said propylene glycol (PG) is less than 0° C.

2. The method according to claim 1 further comprising the step of subjecting the liquid composition essentially consisting of propylene glycol (PG), optionally diethylene glycol monomethyl ether (DEGMME), diethylene glycol monobutyl ether (DEGMBE), or combinations thereof, and a urease inhibitor of the type phosphoric triamide, and optionally a dye system, to an ultrasonic treatment.

3. The method according to claim 1, wherein the urease inhibitor of the type phosphoric triamide is a compound of formula (I):

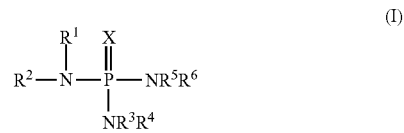

wherein:
X is oxygen or sulphur;
R$^1$ is selected from the group consisting of alkyl, cycloalkenyl, aralkyl, aryl, alkenyl, alkynyl, and cycloalkyl; and
R$^2$ is selected from the group consisting of hydrogen, alkyl, cycloalkenyl, aralkyl, aryl, alkenyl, alkynyl, and cycloalkyl, or
R$^1$ and R$^2$ together may form an alkylene or alkenylene chain which may optionally include one or more heteroatoms of divalent oxygen, nitrogen or sulphur, completing a 4-, 5-, 6-, 7-, or 8-membered ring structure; and
R$^3$, R$^4$, R$^5$ and R$^6$ are individually selected from the group consisting of hydrogen and alkyl having 1 to 6 carbon atoms, and
R$^1$, R$^2$, R$^3$, R$^4$, R$^5$ and R$^6$, when not hydrogen, may each be optionally substituted with one or more selected from the group consisting of trihalomethyl, naphthoxy, alkyl, halogen, arylmercapto, phenoxy, phenyl, nitro, cyano, amino, alkylamino, dialkylamino, alkoxy, mercapto, alkylmercapto, alkylcarbonyl, arylamino, arylcarbonyl, alkoxycarbonyl, carboxy, diarylamino, and carbonamide.

4. The method according to claim 1, wherein the urease inhibitor is N-(n-butyl) thiophosphoric triamide (nBTPT).

5. The method according to claim 1, wherein the amount of said urease inhibitor of the type phosphoric triamide ranges from 1 to 45 weight %, relative to the total weight of said liquid composition and/or wherein the amount of said propylene glycol (PG), optionally diethylene glycol monomethyl ether (DEGMME), diethylene glycol monobutyl ether (DEGMBE), or combinations thereof, ranges between 55 and 99 weight %, relative to the total weight of said liquid composition.

6. The method according to claim 1, wherein the first temperature is in the range of 20 to 60° C. and/or wherein the second temperature is in the range of 20 to 60° C.

7. The method according to claim 1, wherein the liquid composition essentially consisting of propylene glycol (PG), optionally diethylene glycol monomethyl ether (DEGMME), diethylene glycol monobutyl ether (DEGMBE), or combinations thereof, and a urease inhibitor of the type phosphoric triamide, and optionally a dye system, is kept at a third temperature for a period of a few minutes to 4 hours.

8. The method according to claim 1, wherein the liquid composition essentially consisting of propylene glycol (PG), optionally diethylene glycol monomethyl ether (DEGMME), diethylene glycol monobutyl ether (DEGMBE), or combinations thereof, and a urease inhibitor of the type phosphoric triamide, and optionally a dye system, is ultrasonically treated for a period of a few minutes to 4 hours.

9. The method according to claim 1 further comprising a step wherein an amount of a dye system is added to the liquid composition essentially consisting of propylene glycol (PG), optionally diethylene glycol monomethyl ether (DEGMME), diethylene glycol monobutyl ether (DEGMBE), or combinations thereof, and a urease inhibitor of the type phosphoric triamide at a fourth temperature, preferably at least 20° C.

10. The method according to claim 9, wherein the amount of said dye system ranges between 0 and 1.0 weight %.

11. The method according to claim 1, comprising the steps of:
heating up an amount of propylene glycol to 35 to 50° C.;
adding 10 to 25 weight %, relative to the total weight of said liquid composition, of N-(n-butyl) thiophosphoric triamide (nBTPT) in said propylene glycol;
applying an ultrasonic treatment for 15 minutes;
maintaining said liquid composition essentially consisting of propylene glycol and nBTPT at 60 to 80° C.; and
optionally, adding 0.25 weight %, relative to the total weight of said liquid composition, of a dye system to said liquid composition essentially consisting of propylene glycol and nBTPT at least at 20° C.

12. A liquid composition essentially consisting of propylene glycol (PG), optionally diethylene glycol monomethyl ether (DEGMME), diethylene glycol monobutyl ether (DEGMBE), or combinations thereof, and a urease inhibitor of the type phosphoric triamide, and optionally a dye system, having a crystallization temperature of the urease inhibitor of the type phosphoric triamide in said propylene glycol (PG) of less than 0° C.

13. A liquid composition according to claim 12, having a crystallization temperature of the urease inhibitor of the type phosphoric triamide in said propylene glycol (PG) of less than −2° C.

14. A liquid composition according to claim 12, essentially consisting of propylene glycol (PG) as a solvent and 10 to 20 weight % of N-(n-butyl) thiophosphoric triamide (nBTPT) relative to the total weight of the liquid solution.

15. A solid particulate urea-based composition, comprising a solid particulate urea-based compound and the liquid composition according to claim 12, wherein the liquid composition forms at least partially a coating on at least part of the particles comprising the urea-based compound.

16. The solid particulate urea-based composition according to claim 15, wherein the urea-based compound is selected from the group consisting of urea, urea calcium sulphate (UCaS), urea calcium nitrate (UCaN), urea magnesium nitrate (UMgN), urea calcium phosphate (UCaP), urea magnesium phosphate (UMgP), urea superphosphate (USP), urea calcium ammonium nitrate (UCAN), urea ammonium sulphate (UAS), urea ammonium phosphate (UAP), urea potassium salts (UK), urea-based compound NPK fertilizer, and mixtures thereof.

17. The solid particulate urea-based composition according to claim 15, wherein the composition is a physical blend of the urea-based compound in particulate form and one or more components selected from the group of nitrates, phosphates, sulphates and chlorides in particulate form, selected from the group consisting of: ammonium nitrate, calcium nitrate, calcium ammonium nitrate, sodium nitrate, ammonium sulphate nitrate, potassium ammonium nitrate, ammonium phosphate, such as mono-ammonium phosphate (MAP) and di-ammonium phosphate (DAP), calcium bis (dihydrogen orthophosphate), super phosphate, triple superphosphate, rock phosphate, potassium sulphate, potassium magnesium sulphate, ammonium sulphate (AS), urea ammonium sulphate, urea calcium ammonium nitrate, urea ammonium sulphate, potassium chloride (MOP), potassium sulphate (SOP), urea potassium salts (UK), urea-based compound NPK fertilizer, and mixtures thereof.

18. A liquid urea-based composition, comprising a dissolved urea-based compound and the liquid composition according to claim 12, wherein said liquid composition is intimately mixed with the urea-based compound dissolved in a solvent.

19. A liquid composition according to claim 12, having a crystallization temperature of the urease inhibitor of the type phosphoric triamide in said propylene glycol (PG) of less than −4° C.

20. A liquid composition according to claim 12, having a crystallization temperature of the urease inhibitor of the type phosphoric triamide in said propylene glycol (PG) of less than −6° C.

21. A liquid composition according to claim 12, having a crystallization temperature of the urease inhibitor of the type phosphoric triamide in said propylene glycol (PG) of less than −8° C.

22. A liquid composition according to claim 12, essentially consisting of propylene glycol (PG) as a solvent and 15 to 18 weight % of N-(n-butyl) thiophosphoric triamide (nBTPT) relative to the total weight of the liquid solution.

23. A liquid composition according to claim 12, essentially consisting of propylene glycol (PG) as a solvent and 17.5 weight % of N-(n-butyl) thiophosphoric triamide (nBTPT) relative to the total weight of the liquid solution.

24. A liquid urea-based composition according to claim 18, wherein said urea-based compound is selected from the group of urea, urea ammonium nitrate (UAN), urea calcium nitrate (UCaN), or mixtures thereof, dissolved in water.

* * * * *